United States Patent
Ohnishi et al.

(10) Patent No.: US 6,674,561 B2
(45) Date of Patent: Jan. 6, 2004

(54) OPTICAL STATE MODULATION METHOD AND SYSTEM, AND OPTICAL STATE MODULATION APPARATUS

(75) Inventors: Michihiro Ohnishi, Kanagawa (JP); Tomohiro Nishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 10 days.

(21) Appl. No.: 10/085,533

(22) Filed: Feb. 26, 2002

(65) Prior Publication Data

US 2003/0063361 A1 Apr. 3, 2003

(30) Foreign Application Priority Data

Oct. 2, 2001 (JP) .......................... 2001-306438

(51) Int. Cl.[7] .............. G02F 1/01; G02F 1/00; H04N 9/31
(52) U.S. Cl. ............ 359/238; 359/237; 348/744; 348/750; 348/755
(58) Field of Search .............. 359/237, 238; 348/750, 752, 754, 755, 762, 764, 769, 744; 382/100, 232; 352/57, 60

(56) References Cited

U.S. PATENT DOCUMENTS 5,481,321 A * 1/1996 Lipton .................. 352/57
2003/0053003 A1 * 3/2003 Nishi et al. ............ 348/744

* cited by examiner

*Primary Examiner*—Georgia Epps
*Assistant Examiner*—M. Hasan
(74) *Attorney, Agent, or Firm*—Frommer Lawrence & Haug LLP; William S. Frommer

(57) ABSTRACT

An optical state modulation method is provided. The method comprises steps of periodically modulating luminance of a visible light in temporal domain so as to generate an optical state variation on a recorded image that is obtained by image-capturing of a displayed image, the visible light being superposed on an original display image to produce the displayed image, the optical state variation being independent of an original display image and generating no hampering effect when the displayed image is directly watched.

17 Claims, 13 Drawing Sheets

VERTICAL AXIS INDICATES RECORDING LUMINANCE RATIO FOR DISPLAY LUMINANCE A(1-α)
HORIZONTAL AXIS INDICATES THE NUMBER OF FRAMES. 60 FRAMES CORRESPOND TO ONE SECOND

OPTICAL STATE MODULATION METHOD AND SYSTEM, AND OPTICAL STATE MODULATION APPARATUS

RELATED APPLICATION DATA

This application claims priority to Japanese Patent Application JP 2001-306438, and the disclosure of that application is incorporated herein by reference to the extent permitted by law.

BACKGROUND OF THE INVENTION

1. Field of the Invention

The present invention relates to a technology for modulating an image displayed on a display screen so as to generate an optical state variation that becomes visible in a recorded image obtained through unauthorized image-capturing of the displayed image and hampers watching of the recorded image.

2. Description of the Related Art

A technology for preventing unauthorized recording of an image displayed on a display screen (image/video piracy) is disclosed in U.S. Pat. No. 6,018,374. In the related art disclosed in U.S. Pat. No. 6,018,374, difference of imaging characteristics between human vision and an image-capturing apparatus such as camera is considered, and infrared light is utilized as a means for preventing image/video piracy. Specifically, the related art employs a system in which infrared light projector is placed in a vicinity of an image projector or any other position far from the screen. In the system, infrared light is projected from infrared light projector to the screen so that infrared light reflected at the screen can fall upon the image-capturing apparatus operated by a person conducting image/video piracy. In other words, the technology enables to record an infrared image unrelated to a feature film/video program image when image/video piracy is conducted. Accordingly, quality of the recorded image obtained through image/video piracy can be damaged, and even a location at which image/video piracy has been conducted may be identified. Of course, audience/spectator/viewer (referred as audience hereafter) directly watching a feature film/video image can enjoy it without any difficulty since infrared light can not be perceived by the human vision.

SUMMARY OF THE INVENTION

As described above, sufficient prevention and hampering effect may be accomplished by utilizing infrared light. However, it is desirable to establish a variety of prevention and/or hampering technologies for protecting valuable image/video contents.

According to the present invention, there is provided a technology for applying a periodic modulation to an optical state of visible light that is superposed on an original display image so that, without hampering the direct watching of a displayed image, an optical state variation independent of the original display image can be perceived in a recorded image obtained by image-capturing of the displayed image using a image-capturing apparatus. That is, the modulation technology of the present invention is provided to generate hampering noise (the optical state variation independent from the original display image) that becomes visible when the recorded image is watched and becomes invisible or almost invisible when the displayed image is directly watched.

The optical state variation may include a variation in light-and-dark contrast domain (luminance variation), a variation in color domain, and/or a combination of these variations. In the following section of the present specification, conditions enabling such an optical state variation and application examples utilizing the above-mentioned modulation technology will be described.

BRIEF DESCRIPTION OF THE DRAWINGS

The other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

(A) Basic Principle

(A-1) Human Visual Characteristic on Contrast Variation

In one embodiment of the present invention, the focus is placed on human visual characteristic for optical flickering. Temporal frequency contrast sensitivity of human vision can be obtained by calculating Michelson contrast (just called "contrast" hereafter) for various temporal frequencies, where the Michelson contrast is a contrast at which the human vision system can no longer perceive the flicker of light that is being modulated in sinusoidal fashion in temporal domain.

Figure 1:
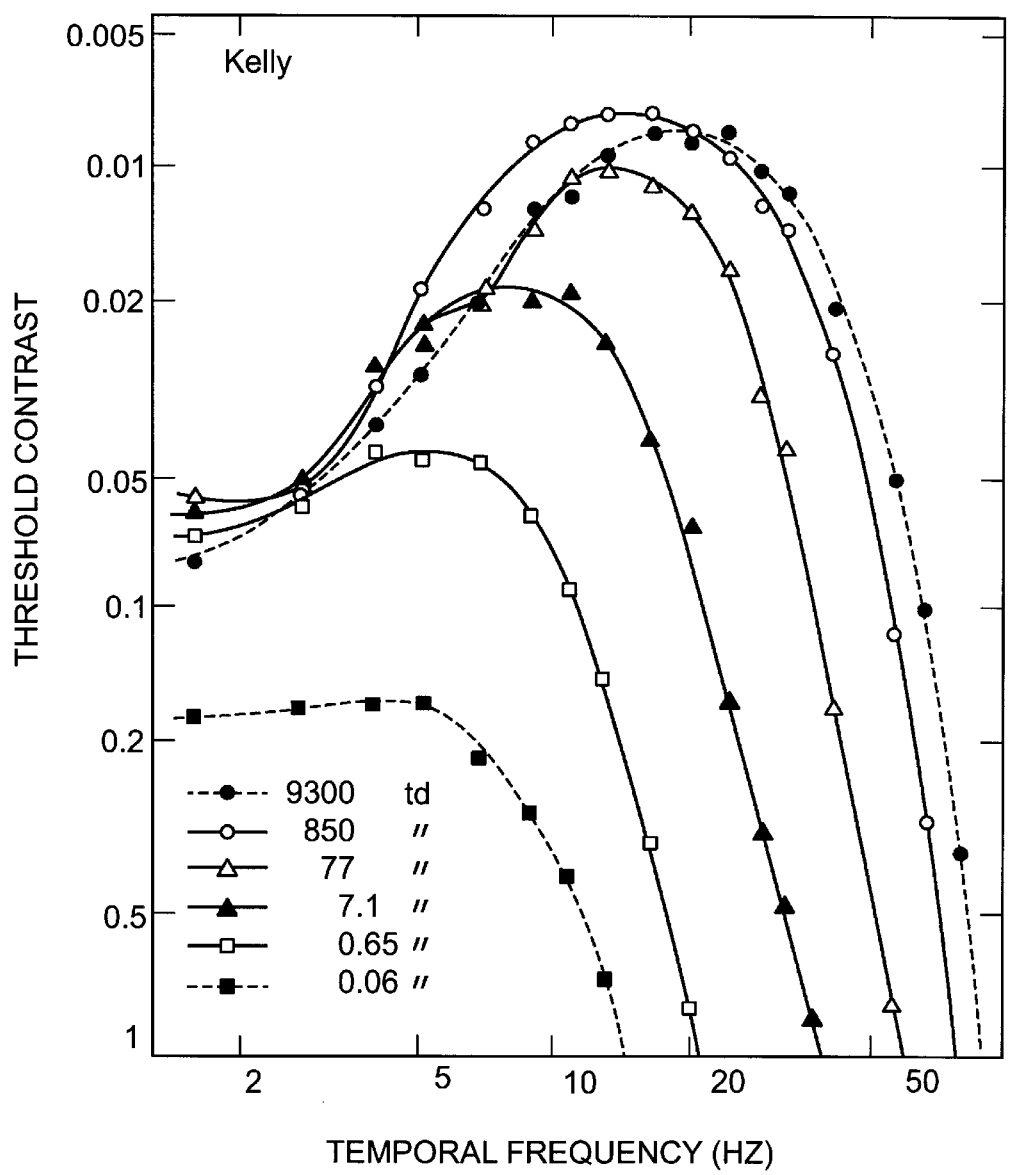
FIG. 1 is a graph showing a contrast sensitivity characteristics of human vision as a function of temporal frequency for various average luminance.

FIG. 1 is a graph showing the contrast sensitivity of human vision as a function of temporal frequency for various average luminance. That is, FIG. 1 shows experimental results measured in various conditions to determine visibility of the flicker on a display screen when displays of light-dark are repeated thereon. The contrast scaled at the vertical axis of the graph is the value of an amplitude divided by an average luminance, and specifically calculated by (Max−Min)/(Max+Min), where Max and Min are the maximum value and the minimum value of the amplitude, respectively. The temporal frequency scaled at the horizontal axis corresponds to a frequency of the light-dark (contrast) variation. Legend symbols in the figure such as ○ and ● respectively indicate corresponding groups of the measured results for different average luminance of the display screen.

In the figure, the average luminance level is called a retina illuminance and may be expressed with a unit Troland (td). The unit corresponds to the luminous level at a retina of the human vision. In other words, the unit "td" corresponds to the value multiplying an area of pupil ($mm^2$) by luminance ($cd/m^2$). 1000 td corresponds to approximately 40 nit, where a unit "nit" corresponds to the luminance ($cd/m^2$).

Each curve line passing through the same symbols in FIG. 1 indicates a threshold boundary at which the flicker of corresponding average luminance can be perceived by the human vision. The flicker can be perceived at a region below the threshold boundary curve line (region corresponding to contrasts equal or more than the temporal frequency contrast sensitivity of human vision). The flicker can not be perceived at a region above the boundary curve line (region corresponding to contrasts less than the temporal frequency contrast sensitivity of human vision).

As shown in FIG. 1, the human vision sensitivity for the flicker peaks at 10–20 Hz. Here, the higher the human sensitivity becomes, the smaller contrast variation of the flicker can be perceived. Lager contrast variation is required for the flicker to be perceived at frequencies higher than the above peak range. For example, the flicker can not be perceived at the average luminance of 77 td and the contrast variation of 10% at about 50 Hz. For the human vision, a light with a constant luminance that is a temporal average of the flickering variation is observed.

The above-mentioned human vision characteristic is utilized in display apparatuses such as film movie projectors which uses a frame frequency of 48 Hz and a TV receiver with a CRT display which uses a display frame frequency of 60 Hz, thereby displaying an image without any flicker.

(A-2) Modulation Condition

(A-2-1) Modulation Condition Causing Human Vision to Perceive no Flicker When Display is Directly Watched First, a modulation condition is obtained for generating the flicker that can not be perceived by the human vision when a display screen is directly watched. In the following, an example is described to obtain the basic condition to be satisfied in a modulation method of the present embodiment. In the example, visible light modulated by a sinusoidal waveform is superposed on an image of a uniform luminance displayed on the display screen. That is, the example is described for superposing a separate visible light on an original display image and applying a periodic luminance modulation to the visible light to be superposed.

The optical state of the displayed image on which the luminance modulated visible light is superposed is described by the following function $F(f,t)$ at time t:

$$F(f,t) = A \times (1-\alpha) + \alpha A \times \cos(2\pi ft) \quad \text{(Equation 1)}$$

where A is a constant, f is a frequency of the modulation, α is a contrast ($1 \geq \alpha \geq 0$) and t is a time.

The first part of Equation 1 indicates the average luminance of the displayed image that is superposition of the visible light on the original image, and the second part indicates a temporal modulation component to be added to the first part. Accordingly, the flickering of the displayed image can not be perceived as explained in section (A-1) when an amplitude of the temporal modulation (αA) is set to the value equal or less than an amplitude with which the flicker at the temporal modulation frequency f is no longer visible due to the temporal frequency contrast sensitivity of human vision calculated with the luminance of the displayed image. Consequently, for the human vision, only the displayed image having the constant luminance given by $A \times (1-\alpha)$ is perceived on the display screen.

For example, when the modulation described above is applied to a movie show in a movie theater, only the luminance-modulated visible light of average contrast and amplitude of 6 $cd/m^2$ and temporal frequency of f=72 Hz is required to superpose on the displayed image projected onto a screen. In the present example, it is assumed that all-white-screen of 40 $cd/m^2$ is used as the displayed image and displayed at a rate of 24 frame/second. The luminance of 40 $cd/m^2$ corresponds to the maximum luminance of a typical film image (approximately 1000 td).

As described in the following, a variety of methods may be utilized for applying the luminance modulation to an optical state of the visible light. One of such methods is to use a rotation filter that includes a rotate-able filter part having a sinusoidal density variation along its circumferential direction. The rotation filter is placed in front of a projector lens of a projection type display apparatus (i.e. projector) and its filter part, through which the projection light is transmitted, is being rotated. Alternatively, the rotation filter may also be placed at any other position along the light path of projection.

In the example described above, the sinusoidal modulation with a temporal frequency of 72 Hz and a contrast of 13% is applied on the displayed image having the average luminance of 46 $cd/m^2$. This condition corresponds to the frequency and amplitude condition equal or less than that of the temporal frequency contrast sensitivity of human vision. Accordingly, no flicker is perceived by the human vision of a person who is directly watching the displayed image projected on the screen.

In the present modulation method, the average luminance increases as much as the luminance component of the visible light since the visible light is superposed on the original display image. Specifically, in the example described above, the average luminance becomes $A(1+\alpha)$ ($=40 \times (1+0.13)$) and increases 13% over the original average luminance A. If such additional amount is subtracted from the original luminance in advance and preset the maximum luminance of the displayed image to 34 $cd/m^2$, the original luminance (40 cd/m$^2$) may be kept unchanged at the screen to which image is projected even when the luminance is increased by the superposition of the visible light.

The adjustment of luminance may be accomplished with an image luminance adjustment unit/circuitry. The image luminance adjustment unit/circuitry calculates the above-mentioned increment ratio based on contrast information that is being stored or inputted from outside, and adjusts a light source luminance according to the calculated increment ratio. Alternatively, the image luminance adjustment unit/circuitry may adjust a light source luminance according to the increment ratio that is being stored or inputted from outside.

The method of applying the luminance modulation to the displayed image while generating no visible flicker to the audience is not limited to a case of displaying a uniform image having the same average luminance in the overall area of the display screen (e.g. all-white-screen). The same method may also be applied to a more typical image that has different average luminance depending on a location of corresponding part of the image.

In the present embodiment, it is not necessary to apply the luminance modulation to the overall area of the screen simultaneously. For example, a phase of the luminance modulation may be varied for different positions (spatial positions) of the displayed image. Furthermore, different luminance modulation (different combination of amplitude and frequency) may be applied for different positions (spatial positions) of the displayed image. As described above, the luminance modulation information may be superposed without presenting visible flicker to the audience of the displayed image. Of course, such luminance modulation method can be similarly utilized for a luminance modulation satisfying another condition that will be described in the following when the luminance modulation is applied on the visible light to be superposed on the displayed image.

Furthermore, in the present embodiment, the maximum luminance of the displayed image (superposed image of the original display image and the visible light), may be set independently for different image scene. For example, an image scene having a lower maximum luminance may be subject to the luminance modulation (combination of amplitude and frequency) according to the lower maximum luminance, and an image scene having a higher maximum luminance may be subject to the luminance modulation (combination of amplitude and frequency) according to the higher maximum luminance.

As shown in FIG. 1, the contrast threshold does not vary so much even the luminance of the displayed image is varied greatly. For example, when the average luminance is changed from 850 td to 77 td, the corresponding contrast sensitivity curve is merely switched from the characteristic curve of symbol ○ to the characteristic curve of symbol △. Furthermore, the contrast sensitivity becomes more severe as the average luminance increases. In other words, the higher the average luminance, the easier to distinguish the contrast variation. In practice, the modulation condition may be simply determined satisfactory based on only the maximum luminance (all-white-screen) among all of the image scenes through out a feature film/video program to be watched.

The present embodiment has been described with the examples utilizing a sinusoidal waveform for the luminance modulation. Alternatively, other types of the luminance modulation may be used for varying the optical state of the displayed image. For example, other modulation waveform (composite waveform) such as a rectangular wave and pulse wave may be utilized for the luminance modulation of the visible light to be superposed on the original display image. In this example, the above described condition needs to be satisfied by sinusoidal wave components obtained through spectral analysis such as Fourier transformation performed on the modulation wave (composite wave) used for generating the luminance modulation. That is, the above described condition needs to be satisfied by the amplitude of each sinusoidal wave component of each frequency.

Alternatively, the frequency of the luminance modulation may not be necessary to be constant value. The frequency may be varied in temporal domain providing that the varied frequency still satisfies the above described condition. Furthermore, the waveform of the luminance modulation may not be necessary to be the same. The waveform may be changed in temporal domain providing that the changed waveform still satisfies the above described condition.

Although no lower limit is defined for the amplitude of the sinusoidal waveform in the above described examples, it is preferable to set the amplitude equal or more than an increment threshold of human contrast perception. This condition becomes more important when the contrast variation of the displayed image is to be recorded by an image-capturing apparatus.

The increment threshold of human contrast perception is defined as the minimum luminance difference to be perceived as a contrast difference between an indicator and its background light when the indicator is watched within the background light. In other words, the increment threshold of human contrast perception is a condition for a perceivable contrast difference when the luminance is in a constant state (stationary state), and is not condition during the above described luminance modulation (dynamic state). Under a certain circumstance, the human vision system can not perceive a contrast change even that the contrast α reaches to 100% during the luminance modulation.

The lower limit of the sinusoidal waveform amplitude is set to be equal or more than the increment threshold of human contrast perception at the luminance of the displayed image (superposed image of the original display image and the visible light) because the sensitivity in differentiating the luminance in an image-capturing apparatus such as a video camera or a camcorder is not largely different from the increment threshold of human contrast perception. Accordingly, recording of the contrast difference by the image-capturing apparatus is assured if the luminance modulation amplitude is equal or larger than the increment threshold of human contrast perception.

If the sensitivity of differentiating the luminance in the video camera apparatus or any other image-capturing apparatus that may be used in image/video piracy is higher than the increment threshold of human contrast perception or if the smaller contrast difference can be detected, the above mentioned lower limit may be determined accordingly based on an image-capturing characteristic of the video camera apparatus or any other image-capturing apparatus.

(A-2-2) Method for Generating Contrast Variation to Hamper Watching of Recorded Image Obtained by Image-Capturing Conditions required for generating contrast variation on a recorded image is described in the following.

Images are captured at every constant period of time in the image-capturing apparatus such as a video camera or a camcorder. For example, images are recorded at a frequency of 60 Hz in a video camera with NTSC standard, and a frequency of 50 Hz with PAL standard. The captured image is image data being an luminous flux inputted into an image-capturing device and integrated over a period of shutter opening at every frame of the image-capturing apparatus.

The integrated value of the recording luminance in each frame image may be calculated by the following integral equation when the luminance-modulated display image (i.e. displayed image) is image-captured, providing that an optical state variation of the displayed image can be expressed with the above-mentioned function F(f,t).

$$R(Nr) = \int_{Nr/Sr}^{Nr/Sr+Tr} F(f,t)dt \qquad \text{(Equation 2)}$$

where R(Nr) is the recording luminance at frame Nr, Nr is the number of camera frames (Nr=0, 1, 2, . . . ), F(f,t) is the optical state (luminance in this example) of the displayed image to which the luminance modulation is applied at time t, Sr is a sampling rate of the image-capturing apparatus, and Tr is a shutter speed of the image-capturing apparatus.

By substituting Equation 2 into the above Equation 1, the following Equation 3 is obtained.

$$R(Nr)=A(1+\alpha)Tr+(\alpha A/2\pi f)$$
$$\{\sin(2\pi f(Nr/Sr+Tr))-\sin(2\pi f(Nr/Sr))\} \qquad \text{(Equation 3)}$$

where Nr=0, 1, 2, . . .

The first part of Equation 3 indicates the average luminance of the recorded image, and the second part indicates a temporal modulation component to be added to the first part. As indicated in Equation 3, the amplitude and temporal frequency of the luminance variation at each image-captured frame comprise variations determined by luminance modulation components (frequency f and contrast α) and intrinsic components (sampling rate Sr and shutter speed Tr) of the video camera in use (image-capturing apparatus).

The sampling rate Sr and the shutter speed Tr are the values determined by the image-capturing apparatus that may be used for image/video piracy. Once these values are determined, only the frequency f and the contrast a have to be set in such a way that the period and amplitude of the basic frequency for R(Nr) corresponds to the values equal or more than the temporal frequency contrast sensitivity of human vision at the luminance of the displayed image.

In this example, the flicker is perceived by the human vision on the recorded image obtained through image-capturing of the modulated display images thereby hampering watching of the recorded image.

Accordingly, by appropriately selecting the frequency f and the contrast a of the luminance modulation so as to satisfy the conditions defined in the previous Section (A-2-1) and the present Section (A-2-2), no flicker is perceived when the display screen is directly watched while the flicker is perceived when the recorded image is watched.

Alternatively, the condition described in the previous section (A-2-1) may be relaxed while maintaining the condition described in the present section (A-2-2) if a certain degree of the flicker is acceptable for direct watching. These conditions may be applicable for a case in which the maximum quality of the display images is not required on the condition that watching of the recorded image obtained by image/video piracy can be hampered.

Figure 2:
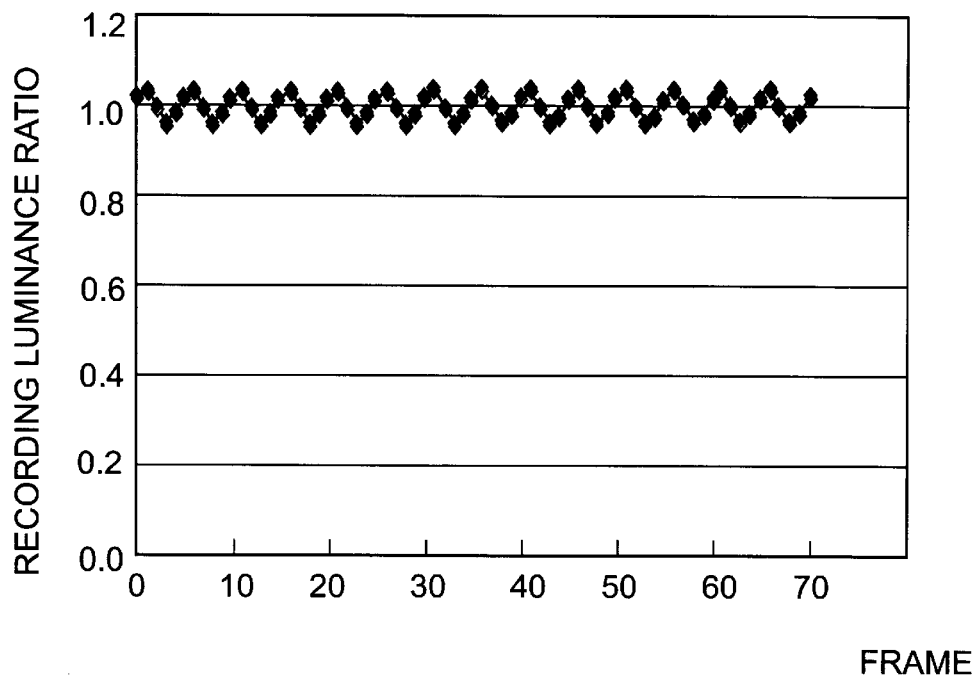
FIG. 2 is a graph showing an example of recording luminance appeared on the recorded image.

Next, the present embodiment will now be described in detail with specific examples. In the following examples, it is assumed that the recorded image is obtained by image-capturing of the displayed image to which the luminance modulation described above is applied with using a NTSC standard video camera. FIG. 2 shows a variation of recording luminance after the image-capturing when a shutter opening period is set to 1/60 second. The shutter opening period of 1/60 second is a typical value used for an automatic shutter function when the image-capturing is performed in darkness of a movie theater during a movie show.

FIG. 2 indicates that the luminance modulation with the contrast α of 3% and the base frequency f of 12 Hz is recorded by the video camera. The contrast variation in the recorded image (copy image) corresponds to a region of a higher value than the temporal frequency contrast sensitivity of human vision as shown in FIG. 1. Accordingly, the flicker in the recorded image is perceived by the human vision and the watching of the recorded image is hampered. That is, the flicker is perceived only by the audience of the recorded image but not by the audience of the displayed image, thereby realizing hampering effect against image/video piracy.

The hampering effect maximizes when the shutter speed and the sampling rate of the image-capturing apparatus being used coincide with the respective values assumed in advance. If a different combination of the shutter speed and the sampling rate is used for the image-capturing, an amount of the flicker in the recorded image may decrease in some case. For example, if the product of f times Tr is set to an integer number in Equation 3, the flicker may be eliminated.

However, a complicate apparatus is required to perform a fine adjustment of the shutter speed and the sampling rate. The fine adjustment may not be required against for a typical case of image/video piracy. Alternatively, it is possible to generate the flicker in the recorded image independent of the shutter speed and/or the sampling rate of the image-capturing apparatus if a type of the luminance modulation (frequency and/or amplitude of the luminance modulation) is varied with time during a period of the display.

In the above described examples, the sinusoidal waveform is used for generating the luminance modulation. Alternatively, a modulation based on any other form may also be utilized to accomplish the similar effect. If a composite wave/pulse form is used as a base of the modulation, the conditions of the present section (A-2-2) and the previous section (A-2-1) need to be satisfied by at least one of sinusoidal wave components of the composite wave/pulse so as to generate the visible flicker on the recorded image by applying the luminance modulation to the display image while generating no visible flicker to the audience who is directly watching the displayed image. The sinusoidal wave components of the composite wave/pulse may be obtained through spectral analysis such as Fourier transformation performed on the base of modulation (composite wave/pulse). If the maximum image quality is not required for the displayed image that are watched directly by the audience, it may not be necessary to completely satisfy the condition of the previous section (A-2-1).

(A-2-3) Keeping Display Luminance Unchanged Before and After Luminance Modulation An additional condition will now be described. The condition described herein is one of conditions to be satisfied to alleviate sense of discomfort when the audience is watching the displayed image. When the luminance modulation satisfying the conditions described above is applied to the display image (image to be displayed) so as to accomplish a desired hampering effect, there is a chance to have a display luminance different from that of the original display image due to mismatch between the luminance modulation period and a display period peculiar to the display apparatus in use. That is, the display luminance in one frame may change before and after the luminance modulation application. Here, the display luminance corresponds to an optical state perceived by the audience, and specifically an averaged luminance over a display period of one frame.

Typically, the audience may not notice such display luminance change since the audience has no knowledge of the original display luminance. However, the display luminance change may become an issue in some case. For example, the display luminance change may become a problem when a highly artistic image is displayed.

In such a case, it is desirable to hold the optical state of the display image unchanged in each frame before and after the luminance modulation application. The following equation has to be satisfied in order to maintain the same display luminance.

$$I(Np) = \int_{Np \times Tp}^{(Np+1) \times Tp} F(f, t) dt \qquad \text{(Equation 4)}$$

where I(Np) is the original display luminance before the luminance modulation application to frame Np at the display apparatus in use. Here, Np=0, 1, 2, . . . , and Tp is a time period of one frame in the display apparatus in use.

The same image as one without the luminance modulation can be displayed if the luminance modulation F(f,t) is designed to satisfy the condition of the present section (A-2-3) as well as the conditions of the previous sections (A-2-1) and (A-2-2). Incidentally, the condition defined by Equation 4 is already satisfied by the specific example described in the section (A-2-1) (the image frequency is set to 24 Hz, the luminance in single frame before the luminance modulation is a constant, and sinusoidal wave of 72 Hz is used for the luminance modulation). According to the specific example, the luminance modulation enabling the hampering effect only applicable for the recorded image may be realized without generating the flicker visible to the audience nor causing any modification of the display image.

(A-3) Human Visual Characteristic for Color Variation

In one embodiment of the present invention, the focus is placed on human visual characteristic for color variation. In this section, it is described that the similar effect as in the previous embodiment in which the optical state is varied in luminance domain may be realized by varying the optical state in color domain.

The optical state variation may also be realized by varying spectral distribution (color components) while holding the same luminance as in the original display image. For example, when the modulation is performed in such a way that red light of 100 cd/m² and green light of 100 cd/m² are displayed alternatively and its modulation frequency is set to approximately 70 Hz, the human vision can not separate these two colors and perceives only the mixture of these colors. Namely, no color variation is visible to the audience who is directly watching the displayed image.

However, when the displayed image is image-captured by an image-capturing apparatus with a sampling rate of 60 Hz, time periods of the red display and the green display in single frame are recorded differently. Accordingly, it becomes possible to generate a color variation between red and green at a lower variation frequency (10 Hz in the instant example) that is visible only in the recorded image, thereby realizing the hampering effect with utilizing the optical state variation in color domain.

Figure 3:
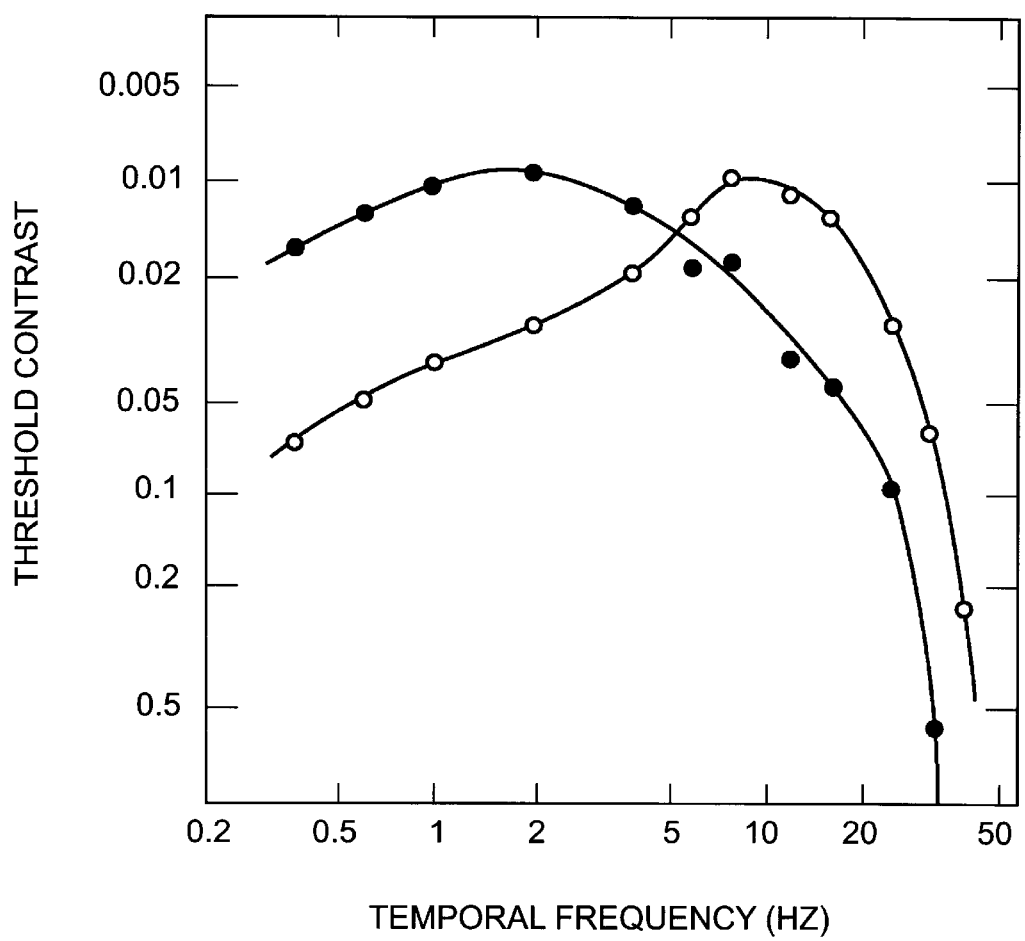
FIG. 3 is a graph showing a contrast sensitivity characteristics of human vision as a function of temporal frequency for different color states.

A specific example will now be described. FIG. 3 shows the contrast sensitivity of human vision on the color variation as a function of temporal frequency. In FIG. 3, the upper region beyond a characteristic curve (where the contrast variation is smaller) is a region in which the human vision system can not perceive, and the lower region below the characteristic curve (where the contrast variation is larger) is a region in which the human vision system can perceive.

Figure 4:
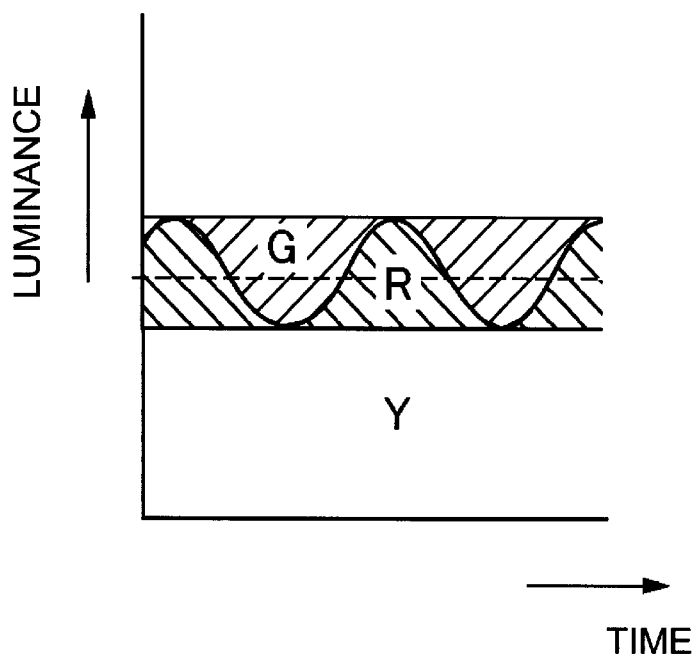
FIG. 4 shows an example of an optical state modulation application in which a sum of luminance values of two different colors is constant and the luminance values for two different colors vary in opposite phases from each other.

A characteristic curve with symbols ● shown in FIG. 3 indicates sensitivity characteristic when green light (G) and red light (R) are modulated in reverse phase so that the sum of luminance of these two color light is kept constant as shown in FIG. 4. Incidentally, letter Y shown in FIG. 4 indicates yellow light. FIG. 4 indicates how the mixture of green light (G) and red light (R) looks like in a typical case.

When such modulation is applied on the image to be displayed and the modulated image that is being displayed is recorded by an image-capturing apparatus, a variation pattern of color changing from red to green and green to red becomes visible while no luminance (corresponding to the contrast) variation is visible in the recorded image.

Of course, conditions (amplitude and frequency) of the luminance modulation to be applied for each color may be determined similarly as that of the contrast variation described in the previous sections. That is, the luminance modulation conditions for each color are selected so that the selected luminance modulation corresponds to a region of FIG. 3 in which the color variation can not be perceived when the displayed image is directly watched, and to another region of FIG. 3 in which the color variation can be perceived when the recorded image obtained through the image-capturing apparatus is watched.

In the present embodiment, the luminance value of a secondary color after the mixture of colors is not necessary to be the same before and after the luminance modulation in a strict sense if no hampering effect is perceived during the period when the displayed image is directly watched by the human vision. Obviously, an appropriate condition may be selected for holding the same luminance value before and after the modulation if necessary. The similar rationale as described in the previous sections (A-2-1) to (A-2-3) may be employed to select such conditions.

Figure 5:
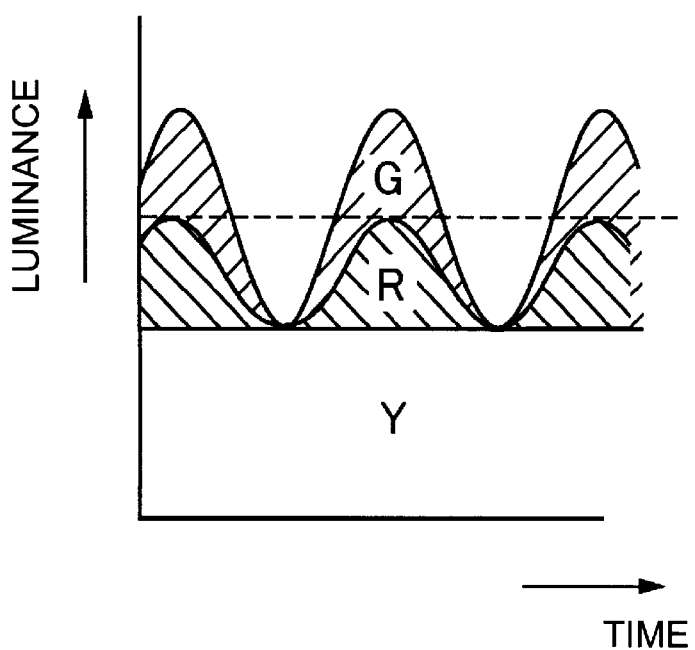
FIG. 5 shows an example of an optical state modulation application in which the luminance values for two different colors vary in the same phase.

Another characteristic curve with symbols ○ is shown in FIG. 3. This characteristic curve indicates the characteristic when green light (G) and red light (R) are varied in the same phase as shown in FIG. 5. In this case, a ratio of color components green light (G) and red light (R) does not change, and only the luminance (light-dark contrast) variation without color change is generated. Accordingly, the contrast modulation described in the previous sections may be realized not only by the luminance variation but also by the color variation.

It is observed that the temporal frequency characteristics of two characteristic curves shown in FIG. 3 are different from each other. FIG. 3 indicates that the contrast variation (characteristic curve of symbols ○) is perceived more easily for the human vision than the color variation (characteristic curve of symbols ●) in a higher frequency. That is, the color variation is less visible than the contrast variation in a higher frequency. It means that the optical state variation in color domain is more effective in practice than the optical state variation in contrast domain in a lower frequency. Accordingly, the optical state variation in color domain can be more readily utilized in practical use compared with the contrast variation.

Although the alternative display of green light (G) and red light (R) is described in the previous sections, an available color combination is not limited to the above in the present embodiment. Various combinations of two colors such as green light (G) and blue light (B), red light (R) and blue light (B) or any other arbitrary combination of two colors may be used. Alternatively, the modulation with three or more colors may also be used instead of the modulation with two colors.

(A-4) Other Modulation Methods

As mentioned above, desired effects of the present embodiment may be accomplished by the optical state variation in both contrast domain and color domain. In such optical state variation, a period of the luminance modulation to be applied is not necessary to be a constant.

For example, a specific meaning may be assigned to a particular temporal frequency of the luminance modulation so as to provide information relating to the display such as location and date/time of the display. Alternatively, if a specific meaning is assigned to a particular is rule of temporal frequency change (for example a sequential order of the change), the information relating to the display may also be provided by analyzing a way of change in the temporal frequency of the luminance modulation. Furthermore, a specific meaning may also be assigned to the contrast (light-dark or color) itself or a rule of the contrast change.

Such information may be provided, for example, by providing a memory that stores the information relating to the display and corresponding types of the luminance modulation (combinations of temporal frequency and contrast), receiving information relating to the display inputted through an input device, and reading out the corresponding type of the luminance modulation based on the inputted information.

Alternatively, the luminance modulation may be applied only at a part (spatial position) of the display image. By utilizing such partial application of the luminance modulation, the information relating to the display such as location and date/time of the display may also be provided. The type of the luminance modulation corresponding to the information relating to the display can be read out by employing the similar system as that of the previous sections.

(A-5) Other Applications

The luminance modulation satisfying the above modulation conditions may be used to hamper watching of the recorded image obtained through image/video piracy. Alternatively, the technologies according to the present embodiment may also be used for various other applications. For example, the technologies may be utilized for a method and/or apparatus for superposing an electronic watermark.

(A-6) Type of Visible Light

The above described visible light may be a monochromatic light or an image similar or the same as the original display image. The monochromatic light may be white color light or any primary color such as red light, green light. The white color light may be a light emitted from a white light source or a white color light mixed from primary colors.

Figure 6:
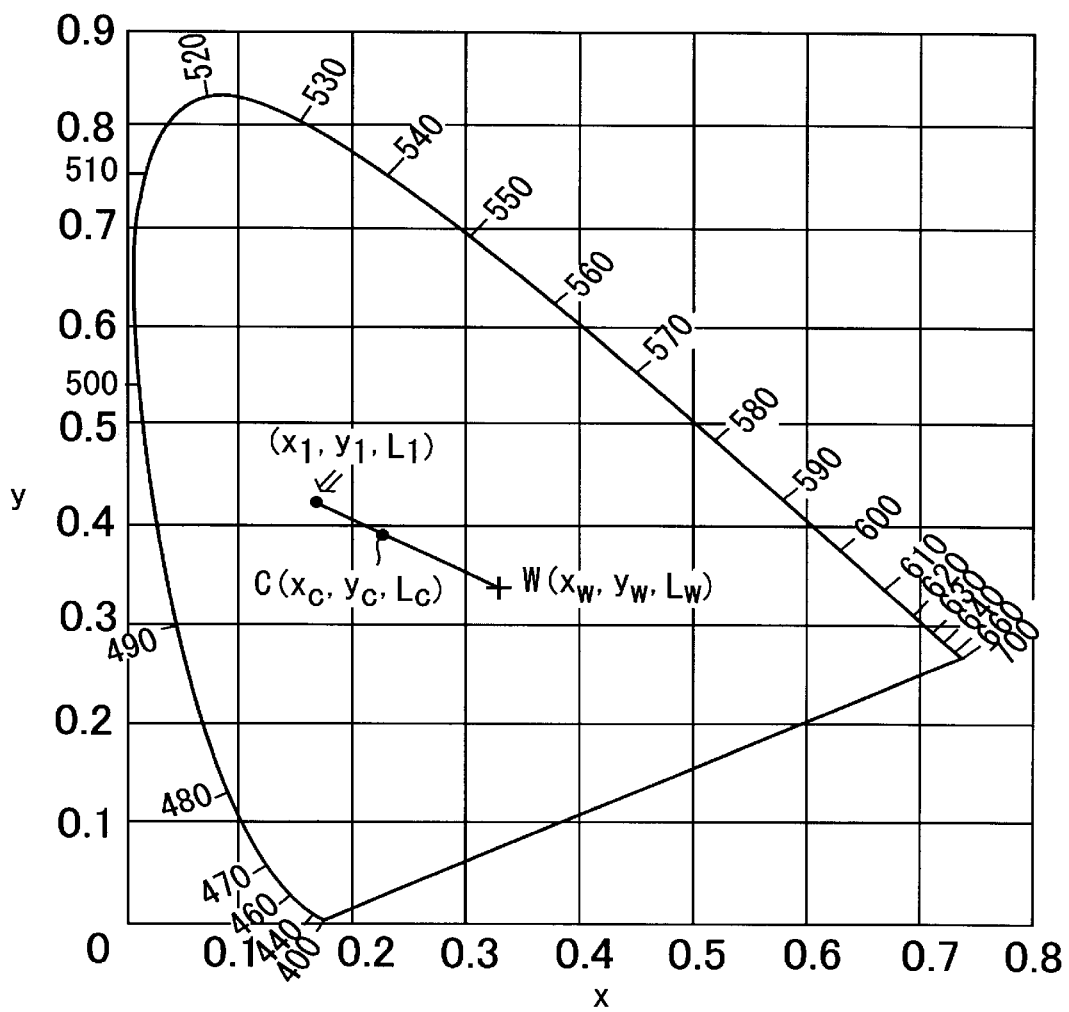
FIG. 6 shows a chromaticity coordinate illustrating effects of color mixture on chromaticity and luminance.

When white color is used for the visible light, it is desirable to use the same white color chromaticity coordinate as that of the light source used in the original display image. The reason of this is described with reference to FIG. 6. FIG. 6 shows a chromaticity coordinate of spectrum light (2 degree viewing angle) represented on a x-y chromaticity diagram. In the chromaticity coordinate, the coordinate values of x and y are parameters indicating hue and chromaticness, and L is a parameter indicating lightness.

In FIG. 6, (xl, yl, Ll) represents a chromaticity coordinate of the original display image, and (xw, yw, Lw) represents a chromaticity coordinate of the visible light. In the instant example, letter w is used as an index since the visible light is assumed to be white color light. Furthermore, (xc, yc, Lc) represents a chromaticity coordinate of a composite light of the original display image and the visible light in FIG. 6.

As shown in FIG. 6, the chromaticity coordinate of the composite light shifts to the center of mass. The center of mass is calculated by weighing each luminance L that being an intensity of the lightness of light to be combined when the visible light is superposed on the original display image. Luminance of the composite light is a sum of the luminance values of lights to be combined as described above.

Deterioration of image quality in the display image can be alleviated to the minimum if the shift of the composite display image on the chromaticity coordinate is small with respect to the coordinate value of the original display image. However, changes of the hue and/or chromaticness caused by the shift in the chromaticity coordinate may be perceived if the chromaticity coordinates of the original display image and the visible light are separated widely or the luminance of the visible light becomes too large to neglect as compared with the luminance of the original display image.

In such a case, it is desirable to have the same white point for the visible light and the light source used for displaying image. By having the same white point, the shift on the chromaticity coordinate of the display image due to the composition of the visible light is always directed to the white point. That is, the image quality deterioration due to the composition of the visible light only occurs in chroma domain.

The audience can not perceive any deterioration in chroma domain since the audience has no knowledge about the original display image before the superposition of the visible light. Of course, the audience does not feel sense of discomfort caused by color shift or the like since the chromaticness of the display image is kept unchanged. Accordingly, in view of the above described reason, it is desirable to coincide the white point of visible light and that of the light source used for displaying the display image when the visible light is superposed without considering contents of the display image.

(A-6) Experiment Result

Figure 7:
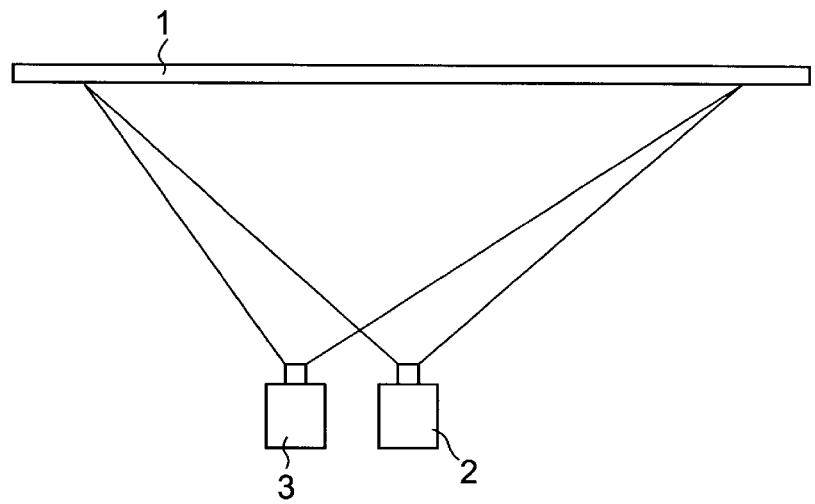
FIG. 7 shows a basic construction of a system according to one embodiment of the present invention.

The above described principle is confirmed by experiments in the following. FIG. 7 shows an example of basic system construction utilizing the above described principle. As shown in FIG. 7, the visible light is modulated according to the above described principle, and the modulated visible light is superposed on the original display image on a screen 1. In the figure, a display image projector apparatus 2 is a projector unit for projecting the original image, and a visible light projector apparatus 3 is a projector unit for projecting the modulated visible light. In the instant example, the visible light is superposed on the overall area of the original display image.

Figure 8:
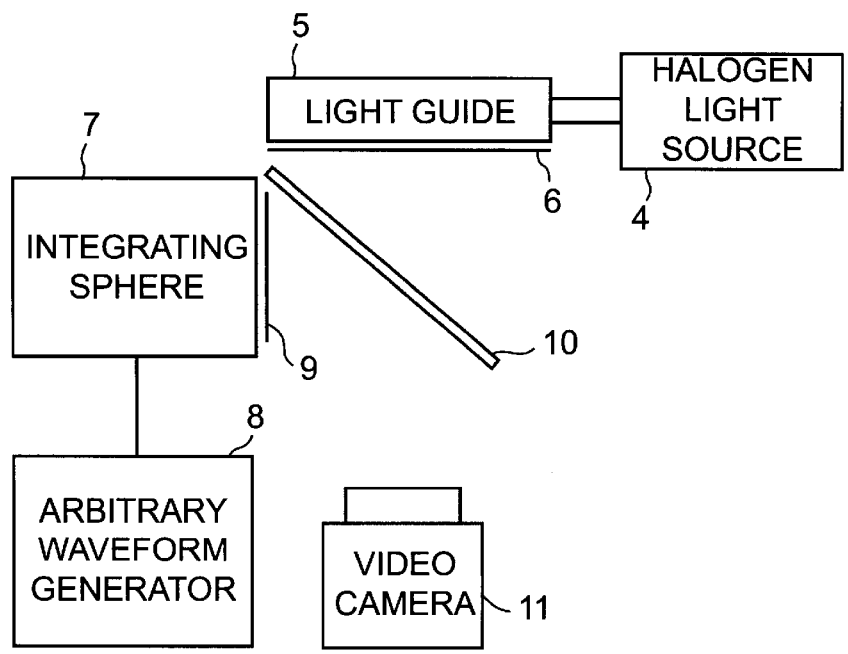
FIG. 8 shows a system construction used for an experiment.

FIG. 8 shows an example of configuration for the experiment system used for demonstrating the above described principle. In the experiment, a halogen light source 4 is used as the light source for displaying the original display image. A surface emission type light guide 5 is coupled to the halogen light source 4, and a transparent sheet 6 with an arbitrary color image is disposed on an output plane of the light guide 5. An image of light transmitted through the transparent sheet 6 is used as an display image.

A composite light source combining a plurality of monochromatic light sources is utilized as a light source of the visible light to be superposed. In the instant example, the light source comprises an integrating sphere and light emitting diodes of red, green and blue attached to the integrating sphere. These LEDs are driven based on a sinusoidal waveform generated by an arbitrary waveform generator 8. The output light from the integral sphere 7 may used when white light or any other monochromatic light is superposed on the original display image. In the instant experiment, a transparent sheet 9, in which the same color image as in the transparent sheet 6 is printed, is disposed in front of an opening of the integral sphere 7 so as to superpose the visible light of image that is equivalent to the original image.

A beam splitter 10 is employed to combine these two image lights. The composite light passed through the beam splitter 10 is assumed as the displayed image projected on a screen and observation is made thereof. Specifically, the composite light is watched with human eyes and image-captured by a video camera 11 of NTSC standard.

First, efficacy is demonstrated when the visible light of a plane white light is superposed. In the instant example, on the beam splitter 10, the chromaticity coordinate value of the light source of the original display image is (x, y, L)=(0.41, 0.41, 130), and the displayed image's luminance is 46 cd/m². Similarly, on the beam splitter 10, the chromaticity coordinate value of the light source of white light is (x, y, L)=(0.41, 0.41, 6), and the white light's luminance is 6 cd/m². A luminance amplitude of white light is set to 6 cd/m².

Subsequently, a frequency of the white light modulation is increased from 10 Hz to 130 Hz. The frequency is incremented by 10 Hz step from 10 Hz to 40 Hz and 5 Hz step from 40 Hz to 130 Hz. The flicker independent of the display image is observed by both direct watching by the human vision and watching of the recorded image taken by the video camera up to 45 Hz, which is equal or less than a critical flicker frequency of human vision at an adaptation luminance of 52 cd/m². When the frequency is increased to equal or more than 50 Hz, no flicker is perceived by the human vision. On the other hand, the flicker is perceived on the recorded image taken by the video camera at all the frequencies equal or more than 50 Hz except frequencies of 60 Hz and 120 Hz. Accordingly, recording of the optical state variation by an image-capturing apparatus is assured when white light is modulated at a frequency equal or more than the critical flicker frequency of human vision.

Next, effects is demonstrated when the visible light of the image equivalent to the original display image is superposed. In the instant example, on the beam splitter 10, the chromaticity coordinate value of the light source of the original display image is (x, y, L)=(0.42, 0.41, 131), and the displayed image's luminance is 42 cd/m². Similarly, on the beam splitter 10, the chromaticity coordinate of the visible light image is (x, y, L)=(0.42, 0.41, 21), and the visible light image's luminance is 13 cd/m². A luminance amplitude of the visible light is set to 13 cd/m².

Subsequently, a frequency of the white light modulation is increased from 10 Hz to 130 Hz. The frequency is incremented by 10 Hz step from 10 Hz to 40 Hz and 5 Hz step from 40 Hz to 130 Hz. Also, in the instant example, the flicker becomes successfully visible only when the recorded image is watched at a modulation frequency equal or more than the critical flicker frequency of human vision at the adaptation luminance of 55 cd/m² except frequencies that are integral multiplies of the image-capturing frequency of the video camera. Accordingly, recording of the optical state variation by an image-capturing apparatus is assured when white light is modulated at a frequency equal or more than the critical flicker frequency of human vision.

(B) Specific Embodiments

Next, embodiments utilizing the above described basic principle will now be described. It is only a matter of application style whether the following systems according to the embodiments should be used as a system for a purpose to hamper watching of the recorded image obtained through image/video piracy or a system for a purpose to record an electronic watermark that enables a tracking of image/video piracy. The basic system configuration is the same in both applications.

(B-1) Configuration Example of Application System

First, a configuration of an application system will now be described. There are two major types of system that provides the optical state modulation in the display image.

Figure 9:
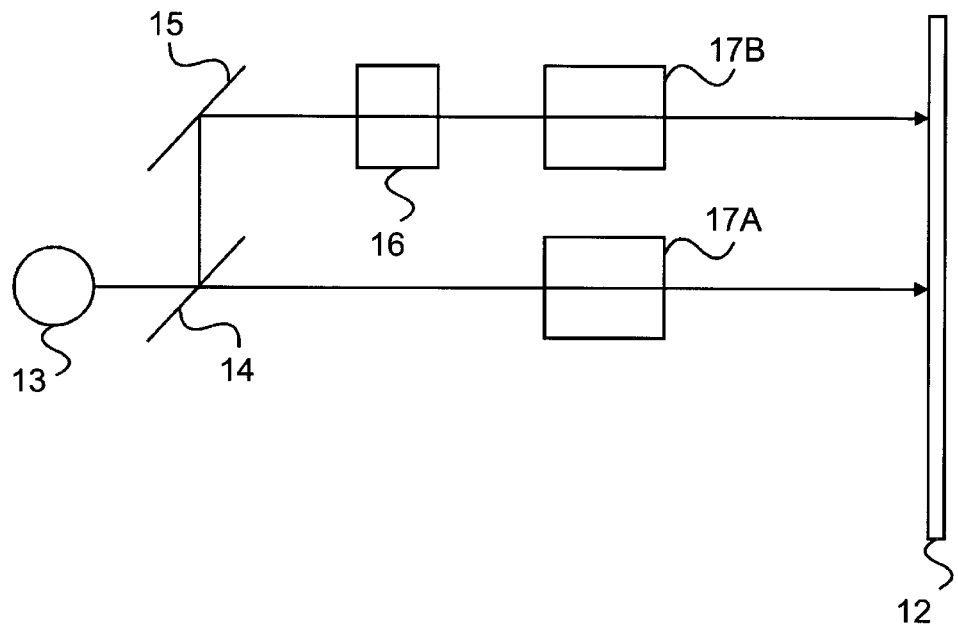
FIG. 9 shows a first system example configured as one of the application system.
Figure 10:
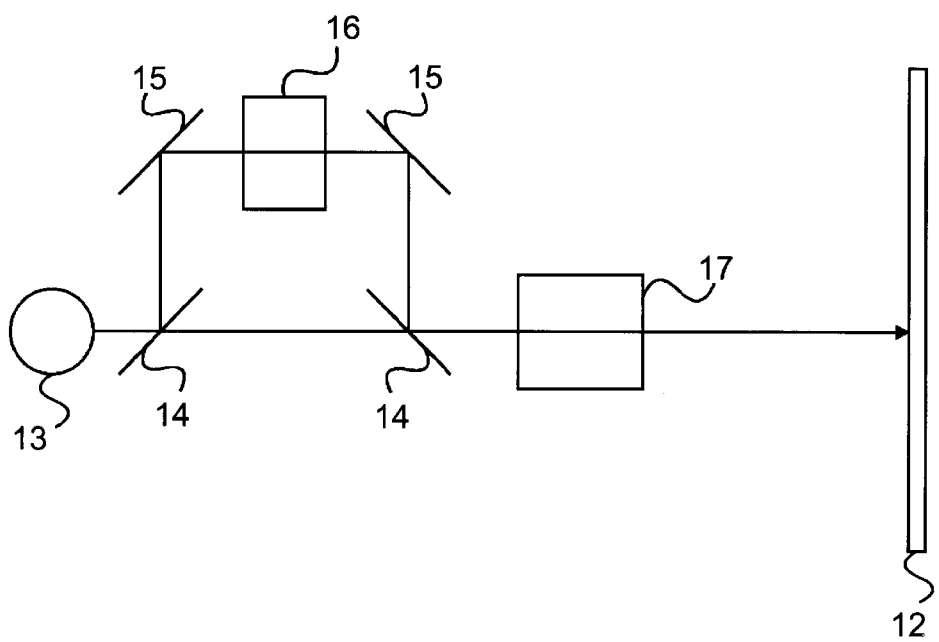
FIG. 10 shows a second system example configured as one of the application system.

The first type is to share single light source for projecting the original display image onto the screen and for projecting the visible light in which the optical state is modulated so as to produce the luminance modulation. Examples of such first type system are shown in FIG. 9 and FIG. 10. The second type is to provide separate light sources for projecting the original display image and for projecting the visible light in which the optical state is modulated so as to produce the luminance modulation, respectively. Examples of such second type are shown in FIG. 11 and FIG. 12.

The former type system shown in FIG. 9 and FIG. 10 has an advantage of saving power consumption in the overall system. In the present system which shares the same light source, there are an optical system used for projecting the luminance-modulated visible light and an optical system used for projecting the original display image. These optical systems may be provided independently (i.e. configured for external connection as an option), or disposed in single casing to compose an integral body.

Figure 11:
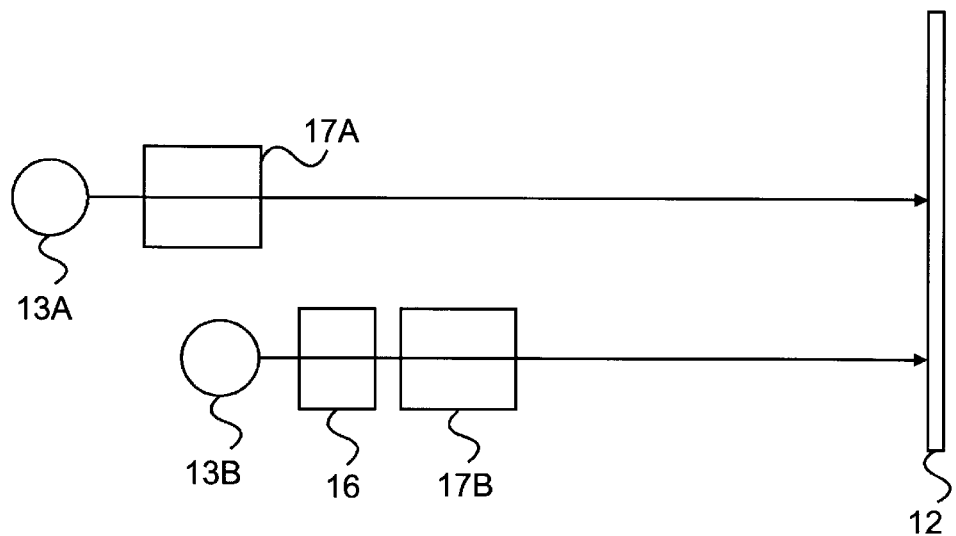
FIG. 11 shows a third system example configured as one of the application system.
Figure 12:
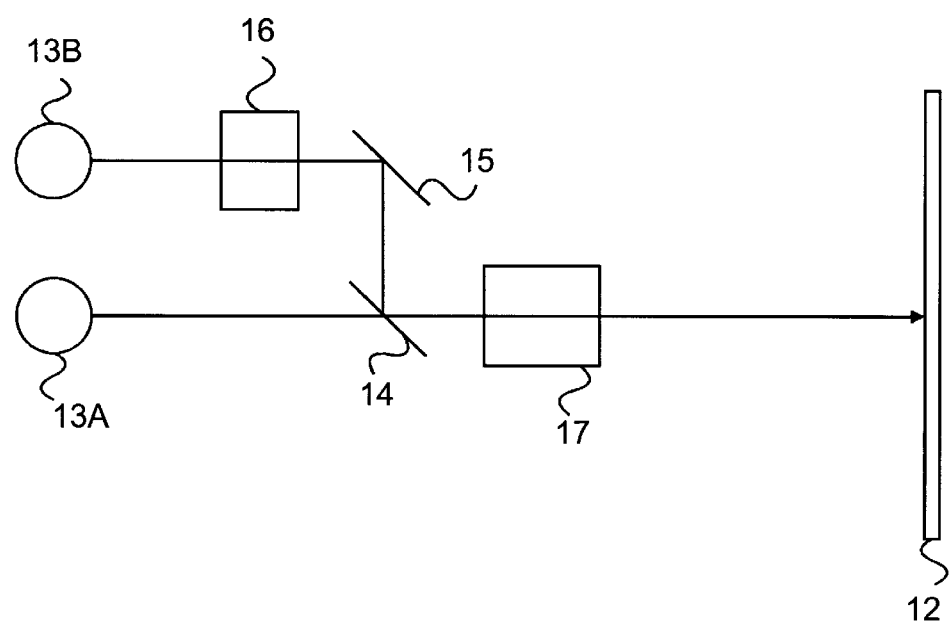
FIG. 12 shows a fourth system example configured as one of the application system.

The latter type system shown in FIG. 11 and FIG. 12 has an advantage of that a spatial relation between the luminance-modulated visible light and a projection light of the original display image can be set arbitrary. In one example, these lights may be projected in reverse direction. Specifically, the original display image is projected onto the screen from front side while the luminance-modulated visible light is projected from back side (rear side). In another example, these light may be projected in such a way that an angle between these projections may be set to a larger value. Specifically, the original display image is projected in a direction normal to the screen surface while the luminance-modulated visible light is projected onto the screen with a slant angle. The luminance-modulated visible light may be projected from a vicinity of the screen. According to the above described examples, sufficient optical state may be secured even when an emission capacity of the light source is relatively small. It is preferable to use the system including separate light sources when independent effects at a plurality of positions on the screen are desired.

FIGS. 9–12 used in the above description are illustrated in view of a position of the light source and a position at which the original display image and the visible light are superposed. Accordingly, a position of an optical state modulation apparatus 16 applying luminance modulation to the optical state of the visible light is not limited to that of the figures.

A unit/circuitry generating the projection light corresponding to the original display image is not shown in FIG. 9 and FIG. 10 since a variety of techniques are available for generating the visible light. For example, a display image generation unit may be disposed after a branching point of the projection light if light emitted from the light source for the original display image is also used as the visible light. Alternatively, the display image generation unit may be disposed before branching the projection light if a projection light corresponding to the original display image is used as the visible light.

Each of the figures are explained briefly. FIG. 9 shows an example of system in which the common light source is shared and the light composition is performed on a screen 12. Alternatively, the light composition may be performed in a space between the screen 12 and a projection apparatus. The projection light outputted from a light source 13 is sent to a beam splitter 14 and branched to a light path for projection of the original display image and a light path for the luminance modulation. A branching ratio for the optical state of the projection light may be set arbitrary. In a typical example, a larger amount is branched to the light path for projecting the original display image. In FIG. 9, a light path in the lower part is for projecting the original display image. A projection optical system 17A is disposed in this light path. Furthermore, a light path in the upper part of FIG. 9 is for the luminance modulation. In this light path, a total reflection mirror 15 for reflecting the branched projection light, the optical state modulation apparatus 16 and a projection optical system 17B are disposed.

FIG. 10 shows an example of system in which the common light source is shared and the light composition is performed inside an apparatus. Also, in the instant example, the projection light outputted from the light source 13 is sent to the beam splitter 14 and branched to a light path for projection of the original display image and a light path for the luminance modulation. In FIG. 10, a light path in the lower part is for projecting the original display image. In this light path, the beam splitter 14 for combining the original display image and the luminance-modulated visible light and the projection optical system 17A for projecting the combined light are disposed. Furthermore, a light path in the upper part of FIG. 10 is for the luminance modulation. In this light path, the total reflection mirror 15 for reflecting the branched projection light, the optical state modulation apparatus 16 and a total reflection mirror 15 for bring the luminance-modulated light back to the light path for projecting the original display image are disposed.

FIG. 11 shows an example of system in which the separate light sources for the original display image and the luminance-modulated visible image are provided and the light composition is performed on the screen 12. In FIG. 11, a light path in the upper part is for projecting the original display image. In this light path, a light source 13A and the projection optical system 17A are disposed. Furthermore, a light path in the lower part of FIG. 11 is for the luminance modulation. In this light path, a light source 13B, the optical state modulation apparatus 16 and the projection optical system 17B are disposed.

FIG. 12 shows an example of system in which the separate light sources for the original display image and the luminance-modulated visible image are provided and the light composition is performed inside an apparatus. In FIG. 12, a light path in the upper part is for the luminance modulation. In this light path, a light source 13B, the optical state modulation apparatus 16 and the total reflection mirror 15 for leading the luminance-modulated light to the light path for projecting the original display image are disposed. Furthermore, a light path in the lower part of FIG. 12 is for projecting the original display image. In this light path, a light source 13A, the beam splitter 14 and the projection optical system 17 are disposed.

(B-2) Examples of Luminance Modulation System

Specific examples of systems (apparatuses) for generating the luminance modulation in the optical state of the visible light will now be described. The following methods of the luminance modulation application may be employed. That are: (1) a method applying the luminance modulation in a light path from the light source to the audience as shown in FIG. 9 to FIG. 12 (no luminance modulation is applied in an output light when the light is emitted from a light source); (2) a method applying the luminance modulation to the light source itself or its driving signal to cause the luminance modulation in the output light when the light is emitted from the light source; and (3) a method applying the luminance modulation to an image signal. Obviously, the luminance modulation may be performed to cause the temporal variation either in light-and-dark contrast domain or color domain.

(a) First Example of Configuration

In the present example, a system functions as a luminance modulation application system for applying modulation to the optical state of the visible light to be superposed on the original display image in such a way that an optical state variation independent of the original display image becomes visible in the recorded image obtained by image-capturing of the original display image while no hampering effect is visible in the displayed image shown on the screen when the displayed image is directly watched. The system comprises the following apparatuses:

(1) a projector apparatus projecting the luminance-modulate visible light onto the screen; and (2) an optical state modulation apparatus acting on the projection light in the projection light path so as to apply a periodic luminance modulation in temporal domain to the optical state of the visible light.

The system relates to the method for modulating the optical state of projection light in the light path before the projection light emitted from the light source reaches the audience. The luminance state modulation apparatus may be provided inside the projector apparatus or provided as an independent apparatus.

(a-1) Specific Example 1

Figure 13:
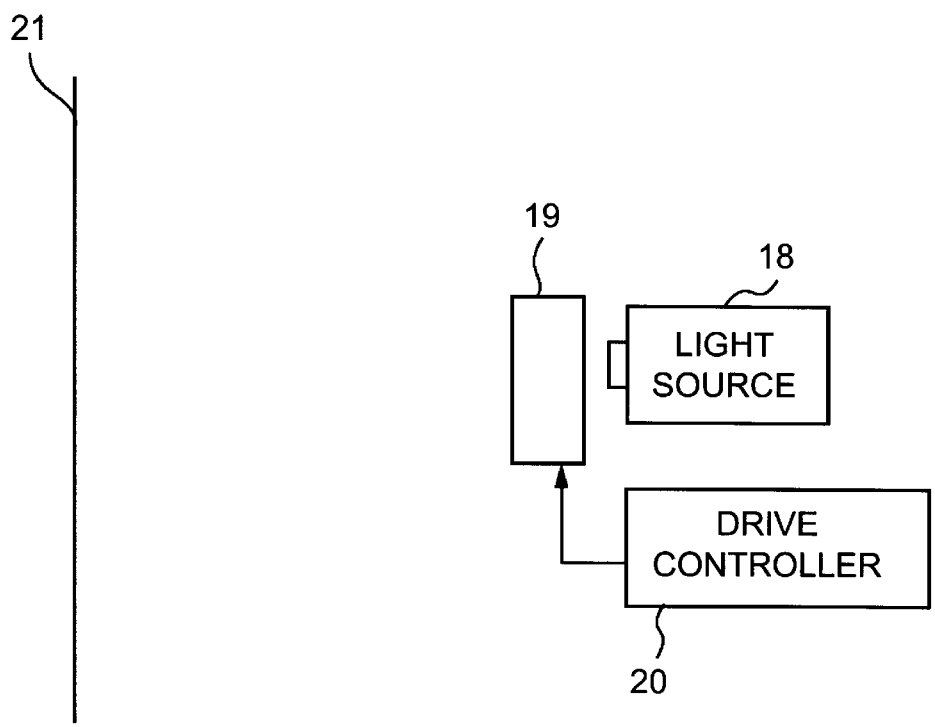
FIG. 13 shows an example of configuration of a projection light modulation type system.

FIG. 13 shows the first specific example of the present system. The system of FIG. 13 is directed to a technique for applying modulation on the projection light in front of a light source 18. The light source 18 may be provided only for the visible light or being shared with for projecting/generating the original display image.

As shown in FIG. 13, the system comprises the light source 18, an optical state modulation apparatus 19 applying luminance modulation on the projection light, and a drive controller apparatus 20 driving and controlling the optical state modulation apparatus 19. A screen 21 may be a part of the present system or may be omitted from the present system. All or some of the configuration elements of the present system may be disposed in single casing to compose an integral apparatus. The system may also be packaged in single body or plural bodies to compose a commercial product. Specifically, the light source 18, the optical state modulation apparatus 19 and the drive controller apparatus 20 may be stored into the separate casings for allowing independent handling. However, in many occasions, these apparatuses would be stored in the same casing according to a preferable form of the present system. A relation of the present system and a system (apparatus) for projecting the original display image is illustrated in FIG. 9 to FIG. 12. These systems may also be integrated into single body to compose an integral apparatus or provided as separate apparatuses.

There are two ways to position the light source 18. One is to position the light source 18 in front of the screen 21 (at audience's side) and the other to position it behind a translucent screen (at rear side) although such positioning way may vary depending on a construction of system to be applied. In the former way, a light reflected at the screen surface is watched by the audience and a front projection type of the display apparatus is employed. In the latter, a light transmitted through a translucent screen is watched and a rear projection type of the display apparatus is employed. In the latter way, the translucent screen and the system of the latter may compose an integral product in most of practical applications.

Although it is not shown in the figure, the system may comprise a signal processing unit processing image signal and an optical system for projecting the luminance-modulated visible light onto the screen 21 in addition to the light source 18. The projector apparatus including these devices may be realized with various forms by utilizing or combining various conventional technologies.

For example, the projector apparatus may be realized with a movie film projector, a CRT (Cathode Ray Tube) projector, a LCD (Liquid Crystal Display) projector, a LED (Light Emitting Diode Display) projector, a PDP (Plasma Display Panel) projector, a DLP (Digital Light Processing) projector, a FED (Field Emission Display) projector, or a ILA (Image Light Amplifier) projector. The DLP projector is a projector utilizing digital micro-mirror devices as image generating devices.

The optical state modulation apparatus 19 is provided to perform the luminance modulation on the optical state of the projection light (display image) outputted from the light source 18. Accordingly, it is preferable to provide a mechanism in the optical state modulation apparatus 19 so as to control increase and decrease of the optical state of the projection light projected from the light source 18 to the screen 21. Such a mechanism may be realized with various ways.

Figure 14:
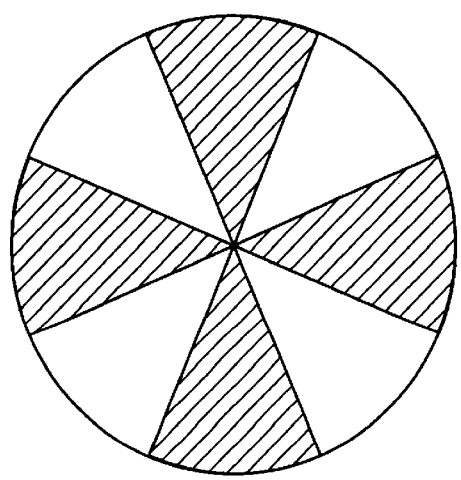
FIG. 14 shows an example of configuration of a rotation filter.
Figure 15:
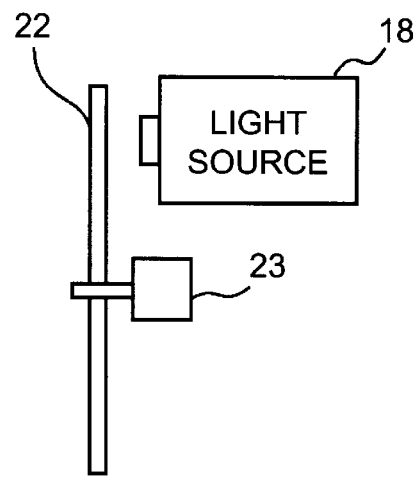
FIG. 15 shows an example of configuration of an optical state modulation apparatus.

For example, a rotation filter 22 may be used as an optical state modulation device of the optical state modulation apparatus 19. The rotation filter 22, as shown in FIG. 14, creates density variation as a rotational angle changes. A desired luminance modulation can be accomplished, as shown in FIG. 15, by connecting the rotation filter 22 with a rotation motor 23 to rotate the rotation filter 22 with a constant speed whereby increasing/decreasing the luminance of light transmitted through the rotation filter 22 according to a density pattern provided thereon. The density pattern formed along a circumferential direction of the rotation filter 22 may be in a form of sinusoidal waveform variation or in a form in which a transparent part and a non-transparent part are alternated. The rotation speed of the rotation motor 23 may be a constant Or varied so as to accomplish the optical state modulation satisfying the above described conditions.

Alternatively, as the optical state modulation device of the optical state modulation apparatus 19, various shutter devices such as a mechanical shutter and a LCD shutter, or, a polarization device such as polarization filter may be used. Any of these devices can generate the luminance modulation of the optical state and achieve similar effects as in the case of utilizing the rotation filter 22.

Although the optical state modulation apparatus 19 is disposed at immediately before the light source 18 in the example shown in FIG. 13, a position of the optical state modulation apparatus 19 is not limited to that of the example. The optical state modulation apparatus 19 may be disposed in front or back of an display image generation device such as the liquid crystal panel, or, in front or back of an optical element such as the beam splitter or the total reflection mirror, or, any other arbitrary position as long as such position is located in a light path before the image light outputted from the light source 18 has reached to the audience. Obviously, the luminance modulation may be performed wherever the optical state modulation apparatus 19 is disposed.

The drive controller apparatus 20 is an apparatus to drive and control the optical state modulation apparatus 19 so as to satisfy the modulation conditions defined in the above cited section (A-2). Specific processing steps executed in the drive controller apparatus 20 may differ depending on a detail specification of the optical state modulation apparatus 19, the object to be controlled. For example, in the example shown in FIG. 15, the drive controller apparatus 20 may be provided with a servo function unit and control rotational motion of the rotation motor 23 to adjust a rotational speed using the servo function unit. Specifically, the drive controller apparatus 20 detects a rotational speed of the rotation motor 23, compares the detected rotational speed with a preset target value of the rotational speed, and controls the rotation motor 23 so as to detect the same rotational speed as the preset target value. The preset target value of the rotational speed, that is required for controlling with the drive controller apparatus 20, may be determined in advance in view of the density pattern of the rotation filter 22. The preset target value may be stored in a memory (storage unit) that may be disposed in the drive controller apparatus 20.

When the optical state modulation apparatus 19 comprises the mechanical shutter or the liquid crystal shutter, opening and closing of the shutter are controlled. If the mechanical shutter comprises a rotary disc having a notch or small hole therein for light transmission, the similar mechanism as in the rotation filter described above may be used. For the mechanical shutter, the control of opening and closing is performed with the drive control apparatus 20 by controlling speed and/or amount of movement of a portion that shield the projection light. For the liquid crystal shutter, the control of opening and closing is performed with the drive control apparatus 20 by controlling alignment change of liquid crystal molecules.

When the polarization device (polarization filter) is used in the optical state modulation apparatus 19, it is preferable to control a relation of polarization angles between a pair of the polarization filters that are facing to each other with the drive control apparatus 20 to apply the luminance modulation in the optical state which is eventually perceived by the audience. Alternatively, one of the pair of the polarization filters may be disposed in audience's side. That is, a pair of glasses with the polarization filter may be worn by the audience. Information required for the above described control may be stored in a memory (storage unit) provided in the drive controller apparatus 20.

(a-2) Specific Example 2

Figure 16:
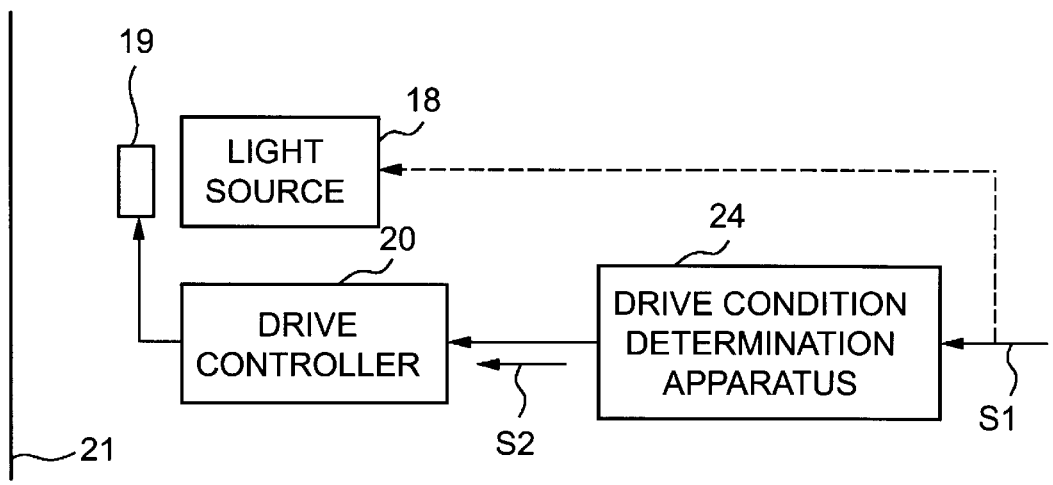
FIG. 16 shows an example of configuration of a projection light modulation type system.

FIG. 16 shows a specific example 2 of the present system. The system of FIG. 16 is a variant of the specific example 1, and includes a function to change a modulation method according to contents of images in addition to the functions provided for the specific example 1. Although a method of modulation is changed according to the image contents in the instant example, the method of modulation may also be controlled independent of the image contents (e.g. based on the lapse of time) in an alternative form.

Figure 17:
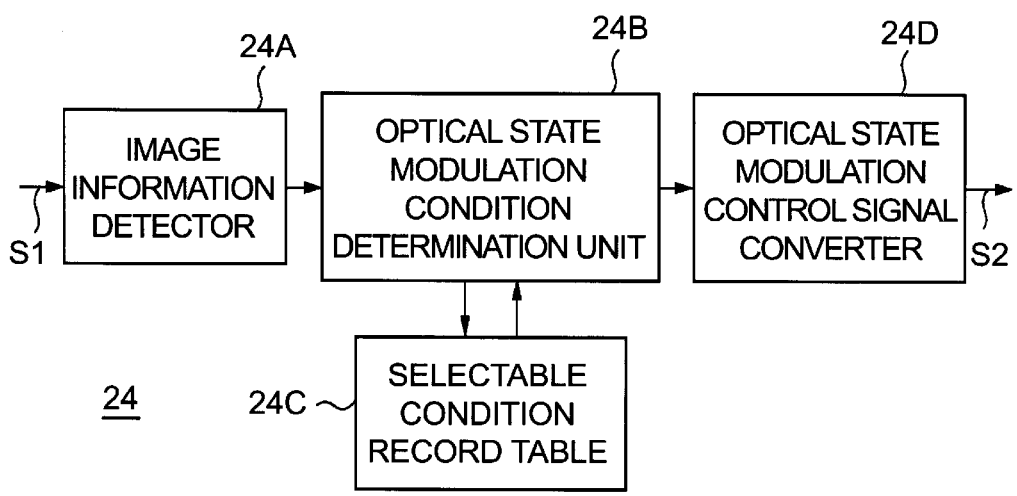
FIG. 17 shows an example of configuration of a drive condition determination apparatus.

In FIG. 16, the same numerals as that of FIG. 13 are used for the corresponding parts of these figures. Detail explanations regarding the display apparatus 18, the optical state modulation apparatus 19 and the drive controller apparatus 20 are not provided since they have the same functions and constructions as in the specific example 1. One of features unique to the system of FIG. 16 is a drive condition determination apparatus 24. The drive condition determination apparatus 24 has functions to detect a luminance signal or color signal from an image signal S1 and change a drive condition accordingly. FIG. 17 shows an example of internal construction of the drive condition determination apparatus 24. In an example shown in FIG. 16, a broken line indicates an image signal S1 sent to the light source 18. This flow of the image signal S1 indicated by the broken line may be employed in some case (e.g. when the original display image is used as the visible light).

The drive condition determination apparatus 24 shown in FIG. 17 comprises an image information detector 24A, an optical state modulation condition determination unit 24B, a selectable condition record table unit 24C and an optical state modulation control signal converter 24D.

The image information detector 24A is provided to detect a desired image information from the image signal S1. The desired image information may be information such as an average luminance value (or color value) for the overall area of the display screen, an average luminance value (or color value) in a particular portion of the display screen, an integrated value calculated with a preset weighing on a luminance distribution of the display image and a color distribution. In the example shown in FIG. 16, the image information detector 24A accepts an input of the image signal S1 that is provide to the projector apparatus (not shown in the figure) projecting the original display image. However, the present embodiment is not limited only to such configuration. Alternatively, when an displayed image of the projector apparatus is image-captured by an image-capturing apparatus such as a video camera, an image signal outputted from the image-capturing apparatus may be accepted as the input.

The optical state modulation condition determination unit 24B (referred as determination unit 24B hereafter) is provided to determine the modulation condition based on the detected image information. Here, the optical state (luminance or color) referenced by the determination unit 24B may be one related to the overall area of the display screen or to a partial area thereof at which the luminance modulation is applied.

The determination unit 24B accesses the selectable condition record table unit 24C and, based on the detected optical state (luminance or color), selects an appropriate modulation conditions (e.g. amplitude, frequency, waveform) from the selectable conditions that enable generation of the visible effect described above when the recorded image obtained through image/video piracy is watched. Applicable criteria of the selection may be related to, for example, whether an amplitude of the optical state variation visible on the recorded image exceeds a preset value or not, and/or, whether a temporal change of the optical state variation visible on the recorded image is in a frequency region with which the human vision can easily perceived (e.g. 1–20 Hz) or not. Alternatively, other criteria of the selection may also be applicable.

The selectable condition record table unit 24C is provided to record plural combinations of the modulation conditions so that the determination unit 24B can select an appropriate combination of the modulation conditions. Here, it is assumed that such combinations of the modulation conditions, that enable generation of the visual effect on the recorded image as described above when the recorded image is obtained through image/video piracy, are calculated or obtained in advance.

The optical state modulation control signal converter 24D is provided to convert the selected modulation condition to a specific drive information. The drive information is formatted corresponding to a specification of the optical state modulation apparatus 19 and/or a control method of the drive controller apparatus 20. For example, the modulation condition is converted to a target value of the rotational speed when the rotational filter 22 is used as in the specific example 1. The converted drive information is supplied to the drive controller apparatus 20 as an optical state control signal S2. Obviously, the optical state modulation control converter 24D stores a conversion table and/or a conversion equation for converting the modulation condition to the preset drive information, and performs the conversion by referencing the conversion table and/or equation.

(b) Second Example of Configuration

In the present example, a system functions as a luminance modulation application system for applying modulation in the optical state of the visible light to be superposed on the original display image in such a way that an optical state variation independent of the original display image becomes visible in the recorded image obtained by image-capturing of the original display image while no hampering effect is visible in the displayed image shown on the screen when the displayed image is directly watched. The system comprises the following apparatuses:

(1) a projector apparatus projecting the luminance-modulated visible light onto the screen; and (2) an optical state modulation apparatus controlling the light source of the projector apparatus to apply a periodic luminance modulation in temporal domain to the optical state of the visible light.

The system relates to the method for outputting the projection light in which the luminance is modulated by controlling the light source itself. The luminance state modulation apparatus may be provided inside the projector apparatus or provided as an independent apparatus.

(b-1) Specific Example 1

Figure 18:
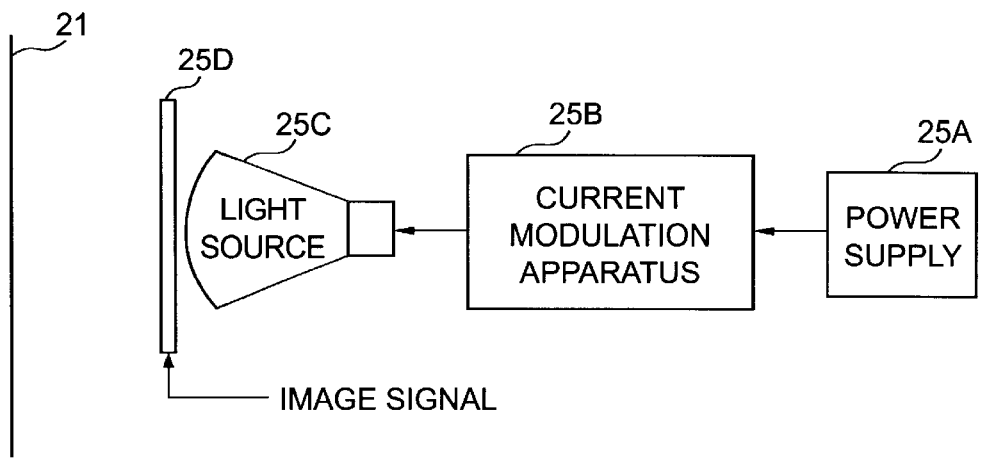
FIG. 18 shows an example of configuration of a light source modulation type system.

FIG. 18 shows specific example 1 of the present system. The system of FIG. 18 is directed to a technique for applying the luminance modulation on the projection light by modulating emission of the light source itself. In this example, the display apparatus is of a non self-emitting type. The display apparatus of a non self-emitting type may be realized in various types of projectors such as a film movie projector, a liquid crystal display projector, a DLP type projector and an ILA type projector.

In the example of FIG. 18, a current modulation apparatus 25B of the projector apparatus 25 corresponds to the optical state modulation apparatus of the present embodiment. The current modulation apparatus 25B controls increase and decrease of the luminance of light outputted from a light source 25C by modulating a drive current provided from a power supply 25A to the light source 25C based on a signal having a waveform with a preset amplitude and frequency. Here, the signal's waveform is assumed to satisfy the modulation conditions defined in the previous section (A-2).

The light source's light, in which the luminance is modulated, may be directly projected onto the screen 21. In FIG. 18, the luminance-modulated light from the light source is projected onto the screen 21 via the image generation unit 25D assuming that the visible light is superposed on the original display image. As a result, the modulation is applied on the image displayed on the screen so as to generate the above cited visual effect in the recorded image that is obtained by image/video piracy of the displayed image. The image generation unit 25D generates the display image by reflecting or letting pass through the light from the light source. The image generation unit 25D may be realized by implementing various devices such as a movie film, a liquid crystal filter and a DMD device.

In the example of FIG. 18, it is assumed that information relating to the waveform of signal used for the luminance modulation in the current modulation apparatus 25B is recorded in advance, for example, in a memory. Alternatively, the modulation condition (e.g. amplitude, frequency, waveform) to be used in the luminance modulation may be determined based on information relating to the display image in a similar way as the specific example 2 shown in FIG. 16.

Although the figure illustrate the system in which the drive current supplied to the light source 25C is controlled, the present embodiment is not limited thereto. Alternatively, the similar control technique may be used in a system in which a drive voltage is controlled. In such system, a voltage modulation apparatus may be used for performing the similar control on the drive voltage that is supplied from the power supply 25A. Furthermore, although the current modulation apparatus 25B is disposed inside the projector apparatus 25 in the example of the figure, the present embodiment is not limited thereto. Alternatively, the current modulation apparatus 25B may also be disposed outside the projector apparatus 25.

The above described system may also be applicable to a system of rear-projection type as well as the system of front projection type.

(b-2) Specific Example 2

Figure 19:
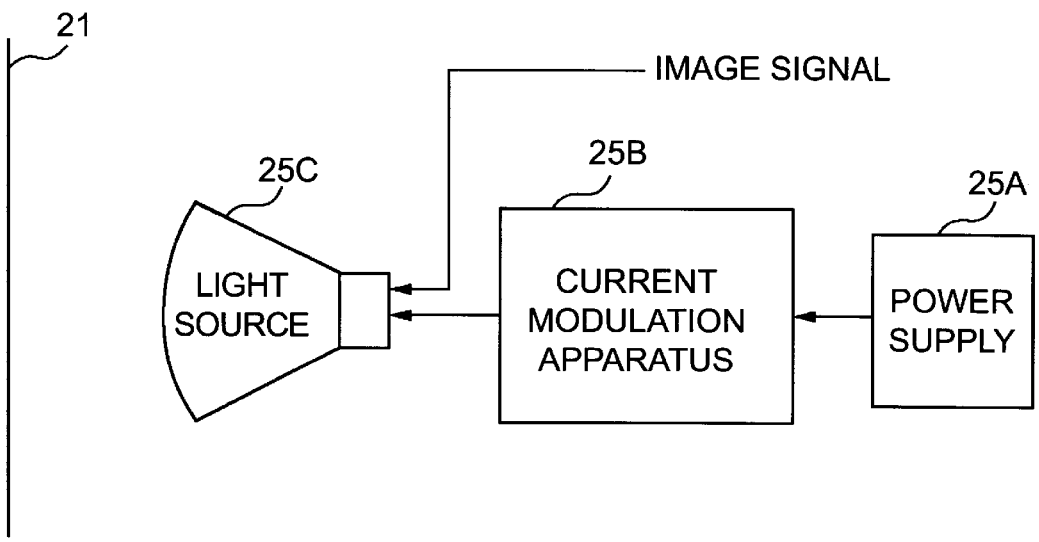
FIG. 19 shows an example of configuration of a light source modulation type system.

FIG. 19 shows specific example 2 of the present system. The system of FIG. 19 is directed to a technique for applying the luminance modulation on the projection light by modulating emission of the light source itself. In this example, the projection apparatus is of a self-emitting type. The same numerals are used for corresponding elements shown in FIG. 18 and FIG. 19. The projection apparatus of a self-emitting type may be realized in various types of projectors such as a CRT projector, a LED projector, a plasma display projector and a FED type projector.

In the present system, being different from the system in the specific example 1, the image signal is sent to the light source 25C. Accordingly, the display image has been generated in the light just outputted from the light source 25C. Specifically, the difference between the specific example 1 and specific example 2 is based on a difference in a method for generating the display image when the original display image is used as the visible light. Accordingly, there is no difference in the apparatus construction when the monochromatic light (including white light) is used for the visible light.

The same current modulation apparatus 25B as that of the specific example 1 may be used in the present system. Also, in the present system, the luminance modulation independent of the image signal may be applied on the display image by controlling the drive current supplied to the light source 25C with the current modulation apparatus 25B.

Obviously, the similar control technique may also be used in a system in which a drive voltage is controlled. Furthermore, although the current modulation apparatus 25B is disposed inside the projector apparatus 25 in the example of the figure, the current modulation apparatus 25B may also be disposed outside the projector apparatus 25.

The above described system may also be applicable to a system of rear-projection type as well as the system of front projection type.

(b-3) Specific Example 3

Specific example 3 is a variant of the specific examples shown in FIG. 18 and FIG. 19. The same system configurations as in the previous specific examples may also be employed in the present example.

The present specific example is directed to a system including the projector apparatus that utilizes a PWM (Pulse Width Modulation) method to control emission of the light source. Such a type of the display apparatus may be realized with, for example, a DLP type projector, a PDP type projector or the like. The projector apparatus of this type generates a gray scale (tone) by accumulating a plurality of emission and non-emission periods in one frame. Accordingly, the above described visual effect may be realized by applying the modulation in addition to such emission sequence.

Figure 20A:
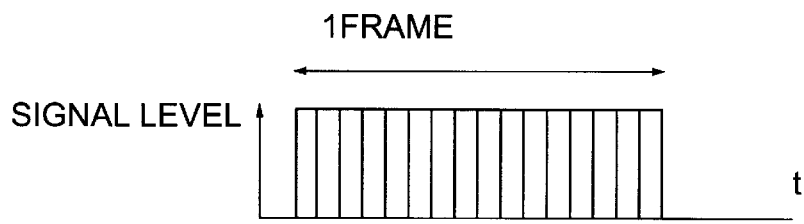
FIG. 20 shows an application example of a pulse width modulation type display apparatus.
Figure 20B:
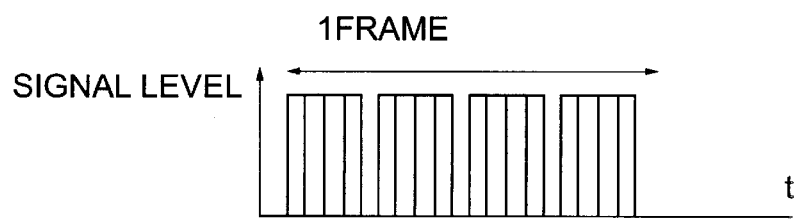

The gray scale representation of the PWM method is performed in the following way. For example, the gray scale may be represented by a drive pattern (a sequence pattern of pulses) shown in FIG. 20A in case of sixteen gray scales are used. As shown in FIG. 20B, a non-emitting period may be added in a periodic manner in addition to the original drive pattern (FIG. 20A) in the present specific example. Obviously, the period and duration of the non-emitting period may be determined to satisfy the modulation condition defined in the section (A-2).

(c) Third Example of Configuration

In the present example, a system functions as a luminance modulation application system for applying modulation in the optical state of the visible light to be superposed on the original display image in such a way that an optical state variation independent of the original display image becomes visible in the recorded image obtained by image-capturing of the original display image while no hampering effect is visible in the displayed image shown on the screen when the displayed image is directly watched. The system comprises the following apparatuses:

(1) a projector apparatus projecting the luminance-modulated visible light onto the screen; and (2) an optical state modulation apparatus controlling the image signal of the projector apparatus to apply a periodic luminance modulation in temporal domain to the optical state of the visible light.

The system relates to the method for modulating the image signal in advance for generating the display image. The luminance state modulation apparatus may be provided inside the projector apparatus or provided as an independent apparatus.

(c-1) Specific Example 1

Figure 21:
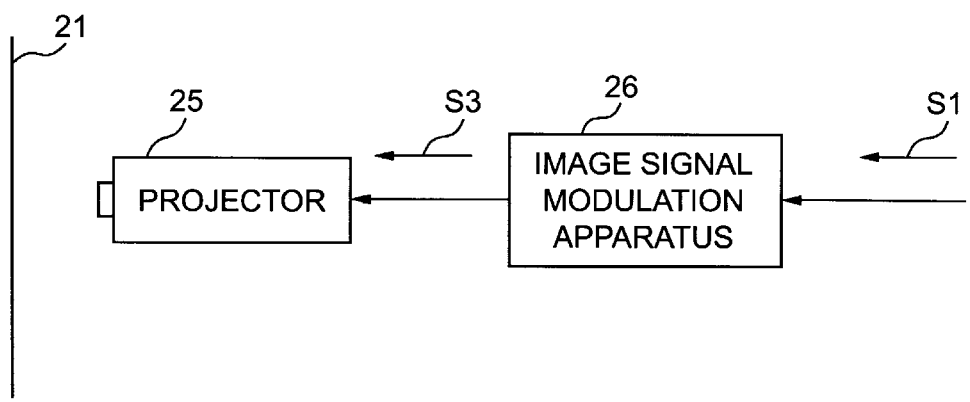
FIG. 21 shows an example of configuration of an image signal modulation type system.

FIG. 21 shows the first specific example 1 of the present system. The system of FIG. 21 is directed to a technique of applying the modulation on the image signal to be inputted to the projector apparatus. In the system of FIG. 21, it is assumed that an image the same as the original image is used as the visible light and an independent light source is provided in addition to the light source for projecting the original display image. In the system of FIG. 21, such modulation function is provided by an image signal modulation apparatus 26. Although the image signal modulation apparatus 21 is disposed outside of the projector apparatus 25 in the present specific example, the image signal modulation apparatus 21 may also be disposed inside the projector apparatus 25. The projector apparatus 25 may be of the non self-emitting type or the self-emitting type.

There are various ways to apply the luminance modulation to the image signal. In the present specific example, one frame is copied to create a plurality of frames with different optical states from each other, and the plurality of frames are outputted within a display period of the one frame. The unit 'frame' represents a unit used in the display operation in the projector apparatus, and may be called as 'field' or 'shot' or the like depending on the projector apparatus in use.

For example, if the image signal for two frames are to be generated from that of one frame, the generated image signal is outputted at a frame rate twice as fast as the input frame rate. Furthermore, when the image signal of one frame is converted to that of two frames, the newly generated image signal is defined so as that the luminance of these two frames becomes different from each other.

The luminance modulation applied in the present specific example is determined so as to satisfy the modulation condition described in the section (A-2). Accordingly, watching of recorded images obtained by image-capturing of the displayed images is hampered while no hampering effect is presented when the displayed image is directly watched.

Figure 22:
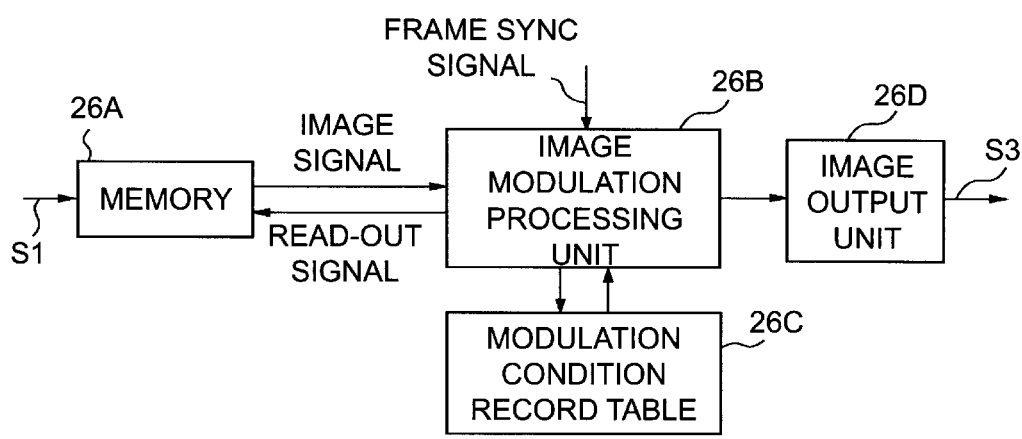
FIG. 22 shows an example of configuration of an image signal modulation type system.

FIG. 22 shows an configuration example of the image signal modulation apparatus 26 performing the above described modulation scheme. The image signal modulation apparatus 26 of FIG. 22 comprises a memory 26A, an image modulation processing unit 26B, a modulation condition record table unit 26C and an image output unit 26D.

The memory 26A is a unit to temporary store the image signal that is inputted. The image modulation processing unit 26B is a unit to perform a processing step for repeatedly reading out a frame image data a plurality of times (e.g. twice) from the memory 26A and a processing step for applying a preset luminance modulation on the read-out frame image data during a time period between receptions of a frame sync signal and the subsequent frame sync signal. The luminance-modulated frame image data is immediately outputted to the image output unit 26D. Accordingly, the frame image data is outputted a plurality of times during a display period of one frame.

The image modulation processing unit 26B performs the above described processing steps after reading out of conditions of the luminance modulation from the modulation condition record table unit 26C. The repetition number of the read-out operation from the memory 26A is determined in accordance with the conditions of the luminance modulation. Here, it is assumed that all the required modulation conditions are stored in the modulation condition record table unit 26C in advance.

The modulation condition record table unit 26C may be replaced with the selectable condition record table unit shown in FIG. 17 when the system includes the image modulation processing unit 26B that also performs the processing step to determine the modulation condition based on the image signal.

The image output unit 26D is a unit to accept an input of the image signal from the image modulation processing unit 26B and outputs the input signal or a processed input signal to the projector apparatus 25.

Accordingly, a plurality of the frame image data having the same image but different display luminance is inputted to the projector apparatus 25 during the display period of one frame.

In the above described examples, the output frame rate of the image modulation processing unit 26B is assumed to be twice as high as the input frame rate. However, in the present embodiment, the output frame rate is not limited to an integral multiplication of the input frame rate. For example, the input frame rate may be multiplied by any real number such as 1.5. When 1.5 is used for the multiplication, a display period for each of the generated frames may vary. Alternatively, it is possible to use a sequence in which two of the newly generated frames are outputted in the original display period for one frame and three of the newly generated frames are outputted for the other frame.

(C) Application for Image-Capturing Prevention System

According to an image-capturing prevention system utilizing the above described luminance modulation application system, both the original display image and an optical image pattern (a pattern of the optical state variation), that enables to prevent viewing of the recorded image at replay operation, are displayed by using visible light thereby making it difficult to separately record the original display image and the optical image pattern.

Furthermore, according to the present modulation method, the original state of the display image can be held unchanged in color and luminance even after the application of the above described modulation on the original display image.

Furthermore, according to the modulation technologies described above, an effective prevention technology against image/video piracy can be realized since an optical image pattern (a pattern of optical state variation) preventing the watching of the recorded image is inseparably recorded.

(D) Application for Electronic Watermarking System

According to an electronic watermarking system utilizing the above described luminance modulation application system, both the original display image and an optical image pattern (a pattern of the optical state variation), that becomes visible when the recorded image is watched at replay operation, are displayed by using visible light thereby making it difficult to separately record the original display image and the optical image pattern.

Furthermore, according to the modulation technologies described above, the original state of the display image can be held unchanged in color and luminance even after the application of the above described modulation on the original display image.

Furthermore, according to the modulation technologies described above, an effective prevention technology against image/video piracy can be realized since an optical image pattern (a pattern of optical state variation) that can be used as an electronic watermark is inseparably recorded as described above.

As described above, the present invention enables to provide the optical state variation, which is independent of original display image and does not hamper direct watching thereof, on the recorded image obtained through image-capturing of the original display image.

While the present invention has been particularly shown and described with reference to preferred embodiments according to the present invention, it will be understood by those skilled in the art that any combinations or sub-combinations of the embodiments and/or other changes in form and details can be made therein without departing from the scope of the invention.

What is claimed is:

1. An optical state modulation method comprising:
   periodically modulating luminance of a visible light in temporal domain so as to generate an optical state variation on a recorded image that is obtained by image-capturing of a displayed image,
   said visible light being superposed on an original display image to produce said displayed image,
   said optical state variation being independent of an original display image and generating no hampering effect when said displayed image is directly watched.

2. The optical state modulation method according to claim 1, wherein,
   when said luminance modulation is performed based on a sinusoidal waveform, an amplitude and frequency of said sinusoidal waveform are determined to satisfy a first condition,
   said first condition being that an amplitude and frequency of said optical state variation in each frame of said recorded image obtained by an image-capturing apparatus correspond to the value equal or more than a temporal frequency contrast sensitivity of human vision determined at the luminance of said original display image.

3. The optical state modulation method according to claim 2, wherein, in addition to said first condition, the amplitude of said sinusoidal waveform is determined to satisfy a second condition, said second condition being that the amplitude of said luminance modulation is equal or less than an amplitude that is obtained from said temporal frequency contrast sensitivity of human vision by setting a frequency component thereof to the frequency of said sinusoidal wave determined in claim 2 at the luminance of said original display image.

4. The optical state modulation method according to claim 1, wherein, when said luminance modulation is performed based on a composite waveform, an amplitude and frequency of at least one of sinusoidal wave components composing said composite waveform are determined to satisfy a first condition, said first condition being that an amplitude and frequency of said optical state variation in each frame of said recorded image obtained by an image-capturing apparatus correspond to the value equal or more than a temporal frequency contrast sensitivity of human vision determined at the luminance of said original display image.

5. The optical state modulation method according to claim 4, wherein, in addition to said first condition, the amplitude of said at least one of sinusoidal wave components is determined to satisfy a second condition, said second condition being that the amplitude of said luminance modulation is equal or less than an amplitude that is obtained from said temporal frequency contrast sensitivity of human vision by setting a frequency component thereof to the frequency of said at least one of sinusoidal wave components determined in claim 4 at the luminance of said original display image.

6. The optical state modulation method according to claim 1, wherein said luminance modulation is performed by applying different types of luminance modulation on corresponding spatial positions of said original display image.

7. The optical state modulation method according to claim 1, wherein said luminance modulation is performed by applying different types of luminance modulation on corresponding time periods.

8. The optical state modulation method according to claim 1, wherein said luminance modulation is performed so as to maintain a same display luminance in each frame before and after said luminance modulation, said display luminance being a luminance perceived by a audience.

9. The optical state modulation method according to claim 1, wherein said optical state variation appeared on said recorded image is a variation in color domain.

10. An optical state modulation application system comprising:

a projector projecting a visible light onto a screen, and an optical state modulation apparatus acting on a projection light in an projection light path to apply a periodic luminance modulation in temporal domain on said visible light, said visible light being superposed on an original display image to produce said displayed image, thereby an optical state variation is generated on a recorded image that is obtained by image-capturing of a displayed image, said optical state variation being independent of an original display image and generating no hampering effect when said displayed image is directly watched.

11. An optical state modulation application system comprising:

a projector projecting a visible light onto a screen, and an optical state modulation apparatus controlling a light source of said projector to apply a periodic luminance modulation in temporal domain on said visible light, said visible light being superposed on an original display image to produce said displayed image, thereby an optical state variation is generated on a recorded image that is obtained by image-capturing of a displayed image, said optical state variation being independent of an original display image and generating no hampering effect when said displayed image is directly watched.

12. An optical state modulation application system comprising:

a projector projecting a visible light onto a screen, and an optical state modulation apparatus controlling an image signal of said projector to apply a periodic luminance modulation in temporal domain on said visible light, said visible light being superposed on an original display image to produce said displayed image, thereby an optical state variation is generated on a recorded image that is obtained by image-capturing of a displayed image, said optical state variation being independent of an original display image and generating no hampering effect when said displayed image is directly watched.

13. An optical state modulation apparatus of an optical state modulation application system, wherein:

a periodic luminance modulation in temporal domain is applied to a projection light projected from a projector to generate an optical state variation on a recorded image that is obtained by image-capturing of a displayed image, said projector being a unit projecting a visible light as said projection light so as to superpose said visible light on an original display image to produce said displayed image, said optical state variation being independent of said original display image and generating no hampering effect when said displayed image is directly watched.

14. An optical state modulation apparatus of an optical state modulation application system, wherein:

a periodic luminance modulation in temporal domain is applied to a light source of a projector to generate an optical state variation on a recorded image that is obtained by image-capturing of a displayed image, said projector being a unit projecting a visible light from said light source so as to superpose said visible light on an original display image to produce said displayed image, said optical state variation being independent of said original display image and generating no hampering effect when said displayed image is directly watched.

15. An optical state modulation apparatus of an optical state modulation application system, wherein:

a periodic luminance modulation in temporal domain is applied to an image signal of a projector to generate an optical state variation on a recorded image that is obtained by image-capturing of a displayed image, said projector being a unit projecting a visible light according to said image signal so as to superpose said visible light on an original display image to produce said displayed image, said optical state variation being independent of said original display image and generating no hampering effect when said displayed image is directly watched.

16. Apparatus for projecting a visible light onto an image displayed on a display screen, the apparatus comprising:

a projection unit projecting the visible light, and a modulation unit generating temporal modulation in the visible light, wherein said modulated visible light is superposed onto the image displayed on the displayed screen to produce a modulated display image, said modulation causes an optical state variation perceivable by a human vision on a recorded image obtained by image-capturing of the modulated display image, and said optical state variation causes no substantial visible effect perceivable by the human vision when said modulated display image is directly watched.

17. Apparatus for projecting a visible light onto an image displayed on a display screen, the apparatus comprising:

means for projecting the visible light, and means for generating temporal modulation in the visible light, wherein said modulated visible light is superposed onto the image displayed on the displayed screen to produce a modulated display image, said modulation causes an optical state variation perceivable by a human vision on a recorded image obtained by image-capturing of the modulated display image, and said optical state variation causes no substantial visible effect perceivable by the human vision when said modulated display image is directly watched.

* * * * *